(12) United States Patent
Yasuda et al.

(10) Patent No.: US 6,862,740 B2
(45) Date of Patent: Mar. 1, 2005

(54) OPTICAL INFORMATION RECORDING MEDIUM, OPTICAL INFORMATION RECORDING/REPRODUCTION METHOD, AND OPTICAL INFORMATION RECORDING/REPRODUCTION APPARATUS

(75) Inventors: Akihiro Yasuda, Katano (JP); Kazuhiro Hayashi, Kadoma (JP); Daisuke Ogata, Amagasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/843,118

(22) Filed: May 11, 2004

(65) Prior Publication Data

US 2004/0210919 A1 Oct. 21, 2004

Related U.S. Application Data

(62) Division of application No. 10/398,030, filed as application No. PCT/JP01/08502 on Sep. 28, 2001.

(30) Foreign Application Priority Data

Oct. 3, 2000 (JP) ....................................... 2000-304030

(51) Int. Cl.$^7$ .............................................. G11B 17/04
(52) U.S. Cl. ..................................................... 720/718
(58) Field of Search ......................... 720/718; 369/125, 369/112, 275.2, 275.4, 284

(56) References Cited

U.S. PATENT DOCUMENTS

| 5,392,263 | A | | 2/1995 | Watanabe et al. |
| 6,246,656 | B1 | * | 6/2001 | Kawakubo et al. .... 369/112.23 |
| 6,469,977 | B1 | * | 10/2002 | Kitaura et al. ........... 369/275.1 |
| 6,723,410 | B2 | * | 4/2004 | Ohno et al. ................ 428/64.1 |

FOREIGN PATENT DOCUMENTS

| EP | 1 043 615 | 10/2000 |
| JP | 09-204689 | 8/1997 |
| JP | 10-302310 | 11/1998 |
| JP | 2000-030299 | 1/2000 |
| JP | 2000-131603 | 5/2000 |

OTHER PUBLICATIONS

Japanese International Search Report for PCT/JP01/08502, dated Jan. 29, 2002.
English translation of Japanese International Search Report for PCT/JP01/08502, dated Jan. 29, 2002.

* cited by examiner

Primary Examiner—Allen Cao
(74) Attorney, Agent, or Firm—RatnerPrestia

(57) ABSTRACT

An optical information recording medium in which the ranges of the refractive index and thickness of a protective layer in a case where the protective layer is constituted by a plurality of layers are newly specified the refractive index and thickness of the protective layer are determined in these ranges, thereby ensuring that even if variation in thickness of the protective layer to ±3 μm is tolerated, spherical aberration in the optical information recording medium is substantially to within 30 mλrms.

13 Claims, 18 Drawing Sheets

PRIOR ART

PRIOR ART

OPTICAL INFORMATION RECORDING MEDIUM, OPTICAL INFORMATION RECORDING/REPRODUCTION METHOD, AND OPTICAL INFORMATION RECORDING/REPRODUCTION APPARATUS

This application is a divisional of U.S. patent application Ser. No. 10/398,030, filed Aug. 19, 2003, which is a U.S. National Phase Application of PCT International Application PCT/JP01/08502 filed Sep. 28, 2001.

TECHNICAL FIELD

The present invention relates to an optical information recording medium which is irradiated with light from an optical head to perform recording and/or reproduction of information, an optical information recording/reproduction method, and an optical information recording/reproduction apparatus.

BACKGROUND ART

Optical disks called "digital versatile disk (DVD)" have been put on the market as a high-density high-capacity optical information recording medium. Such optical disks are now springing into wide use as recording mediums for recording images, music and computer data. Optical disks have a protective layer, which is considered specific to them, and therefore have such characteristics as to be tough to scratch and contamination. However, if the protective layer has a thickness error or a refractive index error, a third-order spherical aberration component of wavefront aberration occurs, which can seriously affect information recording/reproduction characteristics.

An example of a conventional optical disk will be described with reference to drawings. FIG. 12 is a diagram schematically showing an optical disk called a DVD. The optical disk 17 has a protective layer 14, a recording layer 15, and a reinforcing substrate 16. Light having a wavelength of 660 nm is converged by an objective lens 19, and the recording layer 15 is irradiated with this light on the protective layer 14 side, thereby performing recording and/or reproduction of information.

The objective lens 19 is designed so as to have a numerical aperture of 0.6 and so that a third-order spherical aberration component of wavefront aberration which occurs when light having a wavelength of 660 nm passes through a light-transmitting flat plate having a refractive index of 1.58 and a thickness of 0.6 mm is substantially zero.

Polycarbonate is used for the protective layer 14, and a film containing a dielectric or a reflecting film is used for the recording layer 15. The reinforcing substrate 16 prevents the optical disk 17 from being warped or broken.

The protective layer 14 protects the recording layer 15 against air. Also, a surface 18 of the optical disk 17 is separated from the recording layer 15 by the protective layer 14 to prevent degradation of recording or reproduction performance due to dust on the surface 18 or scratches in the surface 18.

However, if the protective layer 14 has a thickness error or a refractive index error, a spherical aberration occurs in the spot formed on the recording layer 15 to badly affect recording/reproduction of information. There is therefore a need to control the thickness and refractive index of the protective layer 14.

FIG. 13 shows an example of specified values of the refractive index and thickness of the protective layer of a DVD. The abscissa represents the refractive index of the protective layer 14, and the ordinate represents the thickness of the protective layer 14. The polygonal line in the graph indicates a region of the refractive index and the thickness with which spherical aberration is within about 30 m$\lambda$rms. For example, if the design values of the refractive index and thickness of the protective layer are fixed at a certain point on the dotted line in FIG. 13 and variation in thickness is limited within the region, a disk capable of normal recording and reproduction of information can be obtained.

FIG. 14 shows a case where a sheet layer 11 and the reinforcing substrate 16 having the recording layer 15 are bonded together by an adhesive layer 13. The protective layer 14 is constituted by the sheet layer 11 formed of polycarbonate or the like and the adhesive layer 13 formed of an ultraviolet curing resin or the like. The refractive index of the sheet layer 11 at a wavelength of 660 nm is 1.58 and the refractive index of the adhesive layer 13 at the same wavelength is 1.51.

In such a case, spherical aberration occurs due to the difference between these refractive indices even if there is no error in the thickness 0.6 mm of the protective layer 14. For example, if the thickness of the sheet layer 11 is 0.56 mm and the thickness of the adhesive layer 13 is 40 $\mu$m, a spherical aberration of about 0.3 m$\lambda$rms occurs, which is sufficiently small.

Thus, in the case where the numerical aperture is 0.6 and the wavelength is 660 nm, the spherical aberration that occurs due to the difference between the refractive indices of the plurality of layers constituting the protective layer is sufficiently small and can therefore be ignored. That is, in the conventional art, the protective layer constituted by a plurality of layers can be treated as one layer and it is possible to avoid an adverse effect on recording and reproduction of information by controlling the refractive index and thickness of the protective layer within the certain ranges shown in FIG. 13 in accordance with a product standard for an optical disk in which spherical aberration is limited.

In recent years, however, studies of next-generation optical disks having a higher recording density have been advanced in various regions. Next-generation optical disks are expected as a recording medium which can replace the currently dominant video tape recorders (VTRs), and the development of them is being promoted in a high pace.

As a means of increasing the recording density of optical disks, there is a method of reducing the spot formed on the recording surface. This is achieved by increasing the numerical aperture for light from the optical head and by reducing the wavelength.

This method, however, has the contrary effect of sharply increasing the spherical aberration due to a thickness error and a refractive index error of the protective layer. A need then rises to control the thickness and refractive index of the protective layer as in the case of the above-described DVD.

FIG. 15 is a diagram schematically showing an optical disk having an increased recording density. The optical disk 27 has a protective layer 24, a recording layer 25, and a reinforcing substrate 26. Light having a wavelength of 400 to 410 nm is converged by an objective lens 29, and the recording layer 25 is irradiated with this light on the protective layer 24 side, thereby performing recording and/or reproduction of information.

The numerical aperture of the objective lens 29 is large, about 0.85. Therefore two lenses are used as the objective lens 29. The objective lens 29 is designed so that a third-order spherical aberration component of wavefront aberration which occurs when light having a wavelength of 405 nm passes through a light-transmitting flat plate made of polycarbonate or the like and having a refractive index of 1.62 and a thickness of 100 μm is substantially zero. The spot formed on the recording layer 25 is reduced in size by increasing the numerical aperture and by reducing the wavelength to achieve an increase in density.

As the recording layer 25, a film containing a dielectric or a reflecting film is used. The reinforcing substrate 26 prevents the optical disk 27 from being warped or broken.

The protective layer 24 protects the recording layer 25 against air. Also, a surface 28 of the optical disk 27 is separated from the recording layer 25 by the protective layer 24 to prevent degradation of recording or reproduction performance due to dust on the surface 28 or scratches in the surface 28.

A sheet layer 21 and the reinforcing substrate 26 having the recording layer 25 are bonded together by an adhesive layer 23. The protective layer 24 is thus formed of two layers.

The sheet layer 21 is formed of polycarbonate or the like and the adhesive layer 23 is formed of an ultraviolet curing resin or the like. The refractive index of the sheet layer 21 at a wavelength of 405 nm is 1.62 and the refractive index of the adhesive layer 23 at the same wavelength is 1.53. In such a case, spherical aberration occurs due to the difference between these refractive indices even if there is no error in the design thickness 100 μm of the protective layer 24.

For example, even if the thickness of the sheet layer is 60 μm; the thickness of the adhesive layer 23 is 40 μm; and the thickness of the protective layer 24 is 100 μm, a spherical aberration of 5.3 mλrms occurs. This spherical aberration remains initially as residual aberration.

Apart from this, a spherical aberration due to variation in thickness which occurs in manufacture of the optical disk is also added. Ordinarily, a thickness variation of about 3 μm occurs and a spherical aberration of 30 mλrms due to the thickness variation results.

Consequently, even if the thickness of the protective layer 24 can be adjusted to 100 μm, the total spherical aberration including the above-mentioned residual spherical aberration 5.3 mλrms is 35.3 mλrms and normal recording or reproduction cannot be performed.

FIG. 16 shows comparison between spherical aberration due to the adhesive layer when the numerical aperture is 0.6 and the wavelength is 660 nm (DVD) and spherical aberration due to the adhesive layer when the numerical aperture is 0.85 and the wavelength is 405 nm. As can be understood from this graph, a large spherical aberration is caused due to the different refractive indices of the plurality of layers constituting the protective layer when the numerical aperture is large and the wavelength is short. This aberration is 15 times or more larger than that in the case of the DVD. If a variation in thickness of the protective layer is further added, the acceptable limit spherical aberration is exceeded, resulting in failure to perform normal recording or reproduction.

DISCLOSURE OF THE INVENTION

In view of the above-described problem of the conventional optical disk, an object of the present invention is to provide an optical information recording medium, an optical information recording/reproduction method, and an optical information recording/reproduction apparatus in which spherical aberration of the protective layer constituted by a plurality of layers is reduced in comparison with that in the conventional art to enable normal recording and/or reproduction.

A first aspect of the present invention is an optical information recording medium comprising a recording layer, and a protective layer including at least first to mth layers (m≧2), wherein when i is an integer satisfying $1 \leq i \leq m$; a refractive index of the ith layer in the protective layer at a wavelength of 405 nm is $n_i$; and a thickness of the ith layer is $d_i$, and when (a) a combined refractive index n of one layer which is substantially equivalent to the plurality of layers constituting the protective layer and substituted for the plurality of layers is specified as $n = ((n_1 d_1 + n_2 d_2 + \ldots n_m d_m)/(d_1/n_1 + d_2/n_2 + \ldots + d_m/n_m))^{0.5}$; (b) a combined thickness d of said one layer is specified as $d = ((n_1 d_1 + n_2 d_2 + \ldots n_m d_m) \times (d_1/n_1 + d_2/n_2 + \ldots + d_m/n_m))^{0.5}$; and (c) an expression $f(n)$: $f(n) = -109.8n^3 + 577.2n^2 - 985.5n + 648.6$ is specified as a design criterion relating to the combined thickness of the protective layer, the refractive index $n_i$ of the ith layer and the combined refractive index n is equal to or larger than 1.45 and equal to or smaller than 1.65, and a difference $d - f(n)$ between the combined thickness and the design criterion is equal to or larger than −10 μm and equal to or smaller than 10 μm.

A second aspect of the present invention is the optical information recording medium according to the first aspect of the present invention, wherein the value of $d - f(n)$ is equal to or larger than −3 μm and equal to or smaller than 3 μm.

A third aspect of the present invention is an optical information recording medium comprising at least first and second recording layers, and a protective layer including a plurality of layers, wherein when first to kth layers (k≧2) in the plurality of layers in the protective layer between a surface of the optical information recording medium and the first recording layer are specified as a first protective layer, and first to mth layers (m>k) in the plurality of layers in the protective layer between the surface of the optical information recording medium and the second recording layer are specified as a second protective layer, when i is an integer satisfying $1 \leq i \leq m$; the refractive index of the ith layer in the protective layer at a wavelength of 405 nm is $n_i$; and the thickness of the ith layer is $d_i$, when (a-1) a combined refractive index n of one layer which is substantially equivalent to the first protective layer and substituted for the first protective layer is specified as $n = ((n_1 d_1 + n_2 d_2 + \ldots + n_k d_k)/(d_1/n_1 + d_2/n_2 + \ldots + d_k/n_k))^{0.5}$; (b-1) a combined thickness d of said one layer is specified as $d = ((n_1 d_1 + n_2 d_2 + \ldots + n_k d_k) \times (d_1/n_1 + d_2/n_2 + \ldots d_k/n_k))^{0.5}$; and (c-1) an expression $f(n)$: $f(n) = -105.8n^3 + 551.5n^2 - 936.9n + 605.2$ is specified as a design criterion relating to the thickness of the first protective layers; and when (a-2) a combined refractive index n of one layer which is substantially equivalent to the second protective layer and substituted for the second protective layer is specified as $n = ((n_1 d_1 + n_2 d_2 + \ldots + n_m d_m)/(d_1/n_1 + d_2/n_2 + \ldots + d_m/n_m))^{0.5}$; (b-2) a combined thickness d of said one layer is specified as $d = ((n_1 d_1 + n_2 d_2 + \ldots + n_m d_m) \times (d_1/n_1 + d_2/n_2 + \ldots + d_m/n_m))^{0.5}$; and (c-2) an expression $g(n)$: $g(n) = -138.7n^3 + 723.7n^2 - 1228.7n +$ 796.0 is specified as a design criterion relating to the thickness of the second protective layers, the refractive index $n_i$ of the ith layer and the combined refractive index n of the first and second protective layers is equal to or larger than 1.45 and equal to or smaller than 1.65, a difference d−f(n) between the combined thickness d of the first protective layer and the design criterion expression f(n) is equal to or larger than −10 μm, and a difference d−g(n) between the combined thickness d of the second protective layer and the design criterion expression g(n) is equal to or smaller than 10 μm.

A fourth aspect of the present invention is an optical information recording medium comprising a recording layer, and a protective layer including at least two layers, wherein when a refractive index of a particular one of the layers in the protective layer at a wavelength of 405 nm is $n_1$; a thickness of the particular one of the layers is $d_1$ (μm); and a thickness of the layers in the protective layer other than the particular one layer is $d_2$ (μm), when (a) equations A, B, C, and D including said $d_2$ are specified as $A=1.280d_2-109.8$, $B=-6.652d_{2+577.2}$, $C=11.27d_2-985.5$, and $D=-6.257d_{2+648.6}$, and (b) an expression $f(n_1)$: $f(n_1)=A \cdot n_1^3 + B \cdot n_1^2 + C \cdot n_1 + D$ is specified as a design criterion relating to the thickness of the protective layer, the refractive index $n_i$ is equal to or larger than 1.45 and equal to or smaller than 1.65, a refractive index of the layers in the protective layer other than said particular one layer at a wavelength of 405 nm is equal to or larger than 1.50 and equal to or smaller than 1.55, and a value of $d_1+d_2-f(n_1)$ is equal to or larger than −10 μm and equal to or smaller than 10 μm.

A fifth aspect of the present invention is the optical information recording medium according to the fourth aspect of the present invention, wherein the value of $d_1+d_2-f(n_1)$ is equal to or larger than −3 μm and equal to or smaller than 3 μm.

A sixth aspect of the present invention is an optical information recording medium comprising a recording layer, and a protective layer including at least two layers, wherein when a thickness of a particular one of the layers in the protective layer is $d_1$ (μm); a thickness of the layers in the protective layer other than said particular one layer is $d_2$ (μm); and an equation $f(d_1)$ including said $d_1$ is specified as $f(d_1)=-0.986d_1+98.6$, a refractive index of said particular one layer at a wavelength of 405 nm is equal to or larger than 1.61 and equal to or smaller than 1.63, a refractive index of the layers in the protective layer other than said particular one layer at the wavelength 405 nm is equal to or larger than 1.50 and equal to or smaller than 1.55, and a value of $d_2-f(d_1)$ is equal to or larger than −10 μm and equal to or smaller than 10 μm.

A seventh aspect of the present invention is the optical information recording medium according to the sixth aspect of the present invention, wherein the value of $d_2-f(d_1)$ is equal to or larger than −3 μm and equal to or smaller than 3 μm.

An eighth aspect of the present invention is an optical information recording medium comprising a recording layer, and a protective layer including at least two layers, wherein when a thickness of a particular one of the layers in the protective layer is $d_1$ (μm); a thickness of the layers in the protective layer other than said particular one layer is $d_2$ (μm); and an equation $f(d_1)$ including said d is specified as $f(d_1)=-1.002d_1+98.6$, a refractive index of said particular one layer at a wavelength of 405 nm is equal to or larger than 1.49 and equal to or smaller than 1.51, a refractive index of the layers in the protective layer other than said particular one layer at the wavelength 405 nm is equal to or larger than 1.50 and equal to or smaller than 1.55, and a value of $d_2-f(d_1)$ is equal to or larger than −10 μm and equal to or smaller than 10 μm.

A ninth aspect of the present invention is the optical information recording medium according to the eighth aspect of the present invention, wherein the value of $d_2-f(d_1)$ is equal to or larger than −3 μm and equal to or smaller than 3 μm.

A tenth aspect of the present invention is an optical information recording medium comprising a recording layer, and a protective layer including at least two layers, wherein when a thickness of a particular one of the layers in the protective layer is $d_1$ (μm); a thickness of the layers in the protective layer other than said particular one layer is $d_2$ (μm); and an equation $f(d_1)$ including said $d_1$ is specified as $f(d_1)=-d_1+98.6$, a refractive index of said particular one layer at a wavelength of 405 nm is equal to or larger than 1.52 and equal to or smaller than 1.54, a refractive index of the layers in the protective layer other than said particular one layer at the wavelength 405 nm is equal to or larger than 1.50 and equal to or smaller than 1.55, and a value of $d_2-f(d_1)$ is equal to or larger than −10 μm and equal to or smaller than 10 μm.

An eleventh aspect of the present invention is the optical information recording medium according to the tenth aspect of the present invention, wherein the value of $d_2-f(d_1)$ is equal to or larger than −3 μm and equal to or smaller than 3 μm.

A twelfth aspect of the present invention is an optical information recording medium comprising a recording layer, and a protective layer including at least first to mth layers (m≧2), wherein when i is an integer satisfying 1≦i≦m; a refractive index of the ith layer in the protective layer at a predetermined wavelength is $n_i$; and a thickness of the ith layer is $d_i$, and when (a) a combined refractive index n of one layer which is substantially equivalent to the plurality of layers constituting the protective layer and substituted for the plurality of layers is specified as $n=((n_1d_1+n_2d_2+ \ldots +n_md_m)/(d_1/n_1+d_2/n_2+ \ldots + d_m/n_m))^{0.5}$; (b) a combined thickness d of said one layer is specified as $d=((n_1d_1+n_2d_2+ \ldots +n_m d_m) \times (d_1/n_1+d_2/n_2+ \ldots d_m/n_m))^{0.5}$; and (c) an expression f(n) which has the combined refractive index n as a variable, and which is one of, $f(n)=-109.8n^3+577.2n^2-985.5n+648.6$, $f(n)=-105.8n^3+551.5n^2-936.9n+605.2$, and $f(n)=-138.7n^3+723.7n^2-1228.7n+796.0$ is specified as a design criterion relating to the combined thickness of the optical information recording medium, a difference between the combined thickness d and the design criterion expression f(n) is equal to or larger than −10 μm and equal to or, smaller than 10 μm.

A fifteenth aspect of the present invention is an optical information recording/reproduction method comprising performing at least one of recording and reproduction of information on the optical information recording medium according to the first, the fourth, the sixth, the eighth, the tenth, or the twelfth aspect of the present invention by using an optical head having aberration correction means of correcting aberration which occurs due to the thickness of the protective layer of the optical information recording medium.

A sixteenth aspect of the present invention is an optical information recording/reproduction apparatus comprising:

the optical information recording medium according to any one of the first to the twelfth aspect of the present inventions;

an optical head;

a rotating unit which causes rotation of said optical information recording medium;

a control unit which controls said optical head; and recording/reproduction means of performing at least one of recording of information on said optical information recording medium and reproduction of information from said optical information recording medium.

A seventeenth aspect is the optical information recording/reproduction apparatus according to the sixteenth aspect of the present invention, wherein said optical head has aberration correction means of correcting aberration which occurs due to a thickness of the protective layer of said optical information recording medium.

Thus, occurrence of spherical aberration is limited to enable optimized recording and reproduction.

Figure 1:
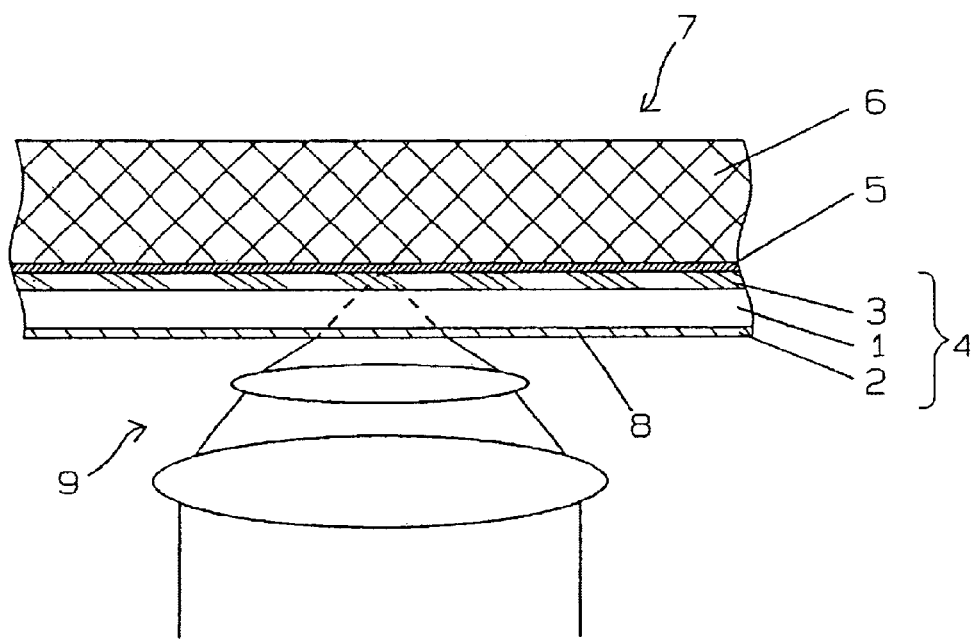
FIG. 1 is a cross-sectional view showing the construction of an optical disk in Embodiment 1 of the present invention.

DESCRIPTION OF SYMBOLS 1, 11, 21 Sheet layer
2 Coating layer
3, 13, 23 Adhesive layer
4, 14, 14 Protective layer
5, 15, 25 Recording layer
6, 16, 26 Reinforcing substrate
7, 17, 27 Optical disk
8, 18, 28 Surface
9, 19, 29 Objective lens
10 Spherical aberration correction element
30 Semiconductor laser
31 Prism
32 Condenser lens
33 Mirror
34 Spherical aberration correction element
35 Objective lens
36 Objective lens driver
37 Optical disk
38 Cylindrical lens
39 Photodetector
40 Optical head
41 Objective lens
42 Motor
43 Shaft
44 Head control circuit
45 Signal processing circuit.

BEST MODE FOR CARRYING OUT THE INVENTION

Embodiments of the present invention will be described with reference to the drawings.

(Embodiment 1)

FIG. 1 is a cross-sectional view of an optical disk which is an embodiment of the optical information recording medium of the present invention.

Referring to FIG. 1, an optical disk 7 has a protective layer 4, a recording layer 5, and a reinforcing substrate 6. Light having a wavelength of 400 to 410 nm is converged by an objective lens 9, and the recording layer 5 is irradiated with this light on the protective layer 4 side, thereby performing recording and/or reproduction of information.

The numerical aperture of the objective lens 9 is large, about 0.85. Therefore two lenses are used as the objective lens 9. The objective lens 9 is designed so that a third-order spherical aberration component of wavefront aberration which occurs when light having a wavelength of 405 nm passes through a light-transmitting flat plate made of polycarbonate or the like and having a refractive index of 1.62 and a thickness of 100 μm is substantially zero.

As the recording layer 5, a film containing a dielectric or a reflecting film is used. The reinforcing substrate 6 prevents the optical disk 7 from being warped or broken. The protective layer 4 protects the recording layer 5 against air. Also, a surface 8 of the optical disk 7 is separated from the recording layer 5 by the protective layer 4 to prevent degradation of recording or reproduction performance due to dust on the surface 8 or scratches in the surface 8.

In the optical disk 7, a sheet layer 1 and the reinforcing substrate 6 having the recording layer 5 are bonded together by an adhesive layer 3, and a coating layer 2 is formed as a surface coating for protection against scratch. The protective layer 4 is thus formed of three layers.

Polycarbonate or the like is used for the sheet layer 1, an acrylic resin or the like is used for the coating layer 2, and an ultraviolet curing resin or the like is used for the adhesive layer 3. The refractive index of the sheet layer 1 at a wavelength of 405 nm is 1.62, the refractive index of the coating layer 2 at the same wavelength is 1.50, and the refractive index of the adhesive layer 3 at the same wavelength is 1.53. Spherical aberration occurs due to the differences between these refractive indices even if there is no error in the design thickness 100 μm of the protective layer 4. Because of the large numerical aperture and the short wavelength, the amount of this spherical aberration is large and not negligible.

In the optical disk of the present invention, if the refractive indices of the sheet layer 1, the coating layer 2 and the adhesive layer 3 at a wavelength of 405 nm are $n_1$, $n_2$, and $n_3$, respectively; and the thickness of these layers are $d_1$, $d_2$, and $d_3$ (μm), $1.45 \leq n_1 \leq 1.65$, $1.45 \leq n_2 \leq 1.65$, $1.45 \leq n_3 \leq 1.65$, $1.45 \leq n \leq 1.65$, and $-3 \mu m \leq d-f(n) \leq 3 \mu m$ are satisfied.

The inventor of the present invention newly introduced the concept of a combined refractive index and a combined thickness, i.e., the refractive index and thickness of one layer which is equivalent to a plurality of layers constituting a protective layer, and which can be substituted for these layers, and thereby enabled fabrication of an optical disk in which spherical aberration was reduced.

In this embodiment, the combined refractive index n can be shown by the following equation 1.
(Equation 1)

$$n=((n_1d_1+n_2d_2+n_3d_3)/(d_1/n_1+d_2/n_2+d_3/n_3))^{0.5}$$

The combined thickness d can be expressed by the following equation 2.
(Equation 2)

$$d=((n_1d_1+n_2d_2+n_3d_3)\times(d_1/n_1+d_2/n_2+d_3/n_3))^{0.5}$$

As mentioned above, these value n and d represent a combined refractive index and a combined thickness obtained by replacing the plurality of layers with one layer equivalent to the plurality of layers. Aberration of light passed through the plurality of layers constituting the protective layer and aberration of light passed through the one equivalent layer derived as described above are substantially equal to each other.

A description will be given below of derivation of these equations 1 and 2.

An expression f(n) shown in the equation 3 below is a third-order approximate curve passing through discrete points at which spherical aberration is substantially zero in aberration calculation based on ray tracing. The value of f(n) corresponds to the combined thickness d.
(Equation 3)

$$f(n)=-109.8n^3+577.2n^2-985.5n+648.6$$

The thickness of the protective layer is specified within the range of ±3 μm from the value indicated by this curve f(n).

Figure 2:
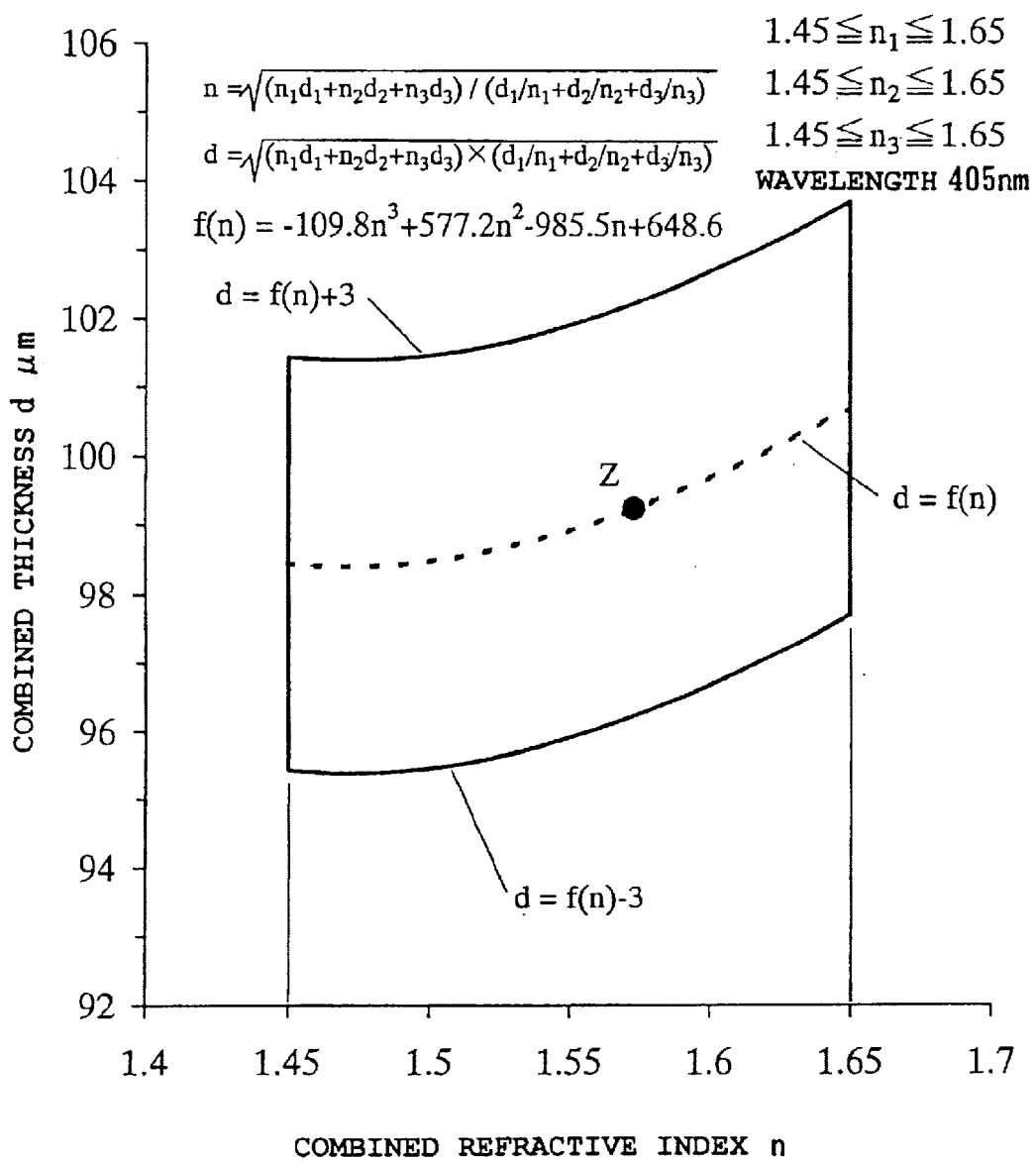
FIG. 2 is a diagram showing the relationship between combined refractive index n and combined thickness d in Embodiment 1 of the present invention.

The combined refractive index n and the combined thickness d satisfying this condition are in the region surrounded by curves and straight lines in FIG. 2. The dotted line is the curve f(n) along which the spherical aberration is substantially zero, i.e., a design criterion for the combined thickness of the protective layer 4.

If the combined refractive index n and the combined thickness d obtained from the thicknesses and the refractive indices of the plurality of layers constituting the protective layer are determined within this region (region surrounded by the solid lines in FIG. 2) by the above-described equations 1 and 2, an optical disk can be fabricated in which the spherical aberration is substantially within 30 mλrms.

For example, if a disk design is such that $n_1=1.62$, $d_1=50.0$ μm, $n_2=1.50$, $d_2=5.0$ μm, $n_3=1.53$, and $d_3=44.2$ μm, then a combined refractive index n=1.57 and a combined thickness d=99.2 μm are obtained by equations 1 and 2. A point which is determined by the combined refractive index and combined thickness obtained in this manner becomes a point Z on the curve f(n) shown in FIG. 2, such that the initial residual spherical aberration is substantially zero. In this case, even if variation in thickness to ±3 μm is tolerated, an optical disk can be fabricated in which the spherical aberration is limited substantially to 30 mλrms.

Thus, an optical disk in accordance with this embodiment of the present invention is designed by considering the thicknesses and refractive indices of the plurality of layers constituting the protective layer, and can therefore be fabricated so that occurrence of spherical aberration is limited.

The meaning of consideration of the thicknesses and refractive indices of the plurality of layers constituting the protective layer will be further described.

That is, the combined refractive index n and the combined thickness d satisfying equation 3 are distributed on the dotted line shown in FIG. 2, as described above. Therefore theoretically, there are an infinite number of combinations of the combined refractive index and the combined thickness satisfying equation 3, for example. Also, theoretically, there are many combinations of the refractive index $n_i$ and the thickness $d_i$ (i=1, 2, 3) of each layer satisfying the relation between equations 1 and 2.

If only a suitable realizable combination of the refractive index $n_i$ and the thickness $d_i$ of each layer is selected from many candidate combinations satisfying these equations, the initial residual spherical aberration is substantially zero. Accordingly, with respect to fabrication of an optical disk in which the overall spherical aberration is substantially within 30 mλrms, variation to ±3 μm may be tolerated in the thickness of the protective layer.

Thus, according to the present invention, an optical disk based on a novel design technique is provided unlike the conventional optical disk that has been fabricated from the viewpoint of considering only variation in thickness of the protective layer and minimizing the variation in order to reduce the spherical aberration.

That is, according to the present invention, a combination of the refractive index $n_i$ and thickness $d_i$ of each layer is selected from many candidate combinations satisfying predetermined equations (equations 1 to 3 in this embodiment) to enable tolerance of ±3 μm, which is a limit value of variation in thickness of the protective layer in a current fabrication technique.

Also, the range of selection of various parameters including the refractive index $n_i$ and thickness $d_i$ of each layer is extended to increase the degree of design freedom.

Derivation of the above-described equations will be described with reference to FIGS. 17(a) and 17(b).

Figure 17:
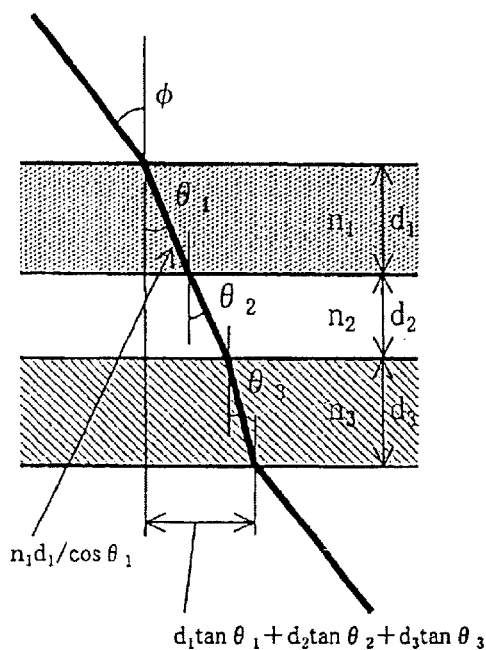
FIGS. 17(a) and 17(b) are diagrams for explaining derivation of equations 1 and 2 in Embodiment 1 of the present invention.
Figure 17:
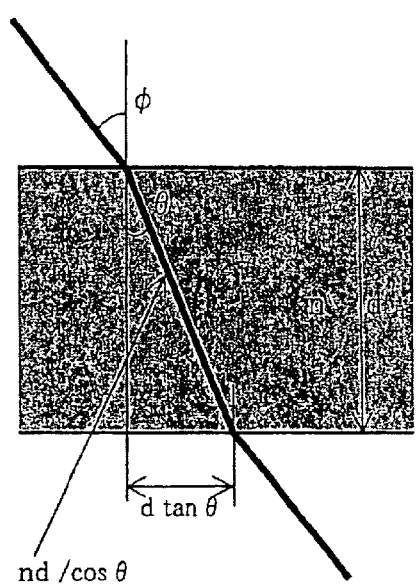

FIG. 17(a) shows the state of refraction of light passing through a plurality of layers, and FIG. 17(b) shows the state of refraction of light passing through one layer. To equalize an aberration of light passing through the plurality of layers and an aberration of light passing through one layer, a condition equation a expressing the equality of the optical path lengths and a condition equation b expressing the equality of the positions of emergent light are simultaneously satisfied with respect to rays incident at an angle of φ.

(Condition Equation a)

$$n_1 d_1/\cos\theta_1 + n_2 d_2/\cos\theta_2 + n_3 d_3/\cos\theta_3 = nd/\cos\theta$$

(Condition Equation b)

$$d_1 \tan\theta_1 + d_2 \tan\theta_2 + d_3 \tan\theta_3 = d\tan\theta$$

These two condition equations a and b are simultaneously established and are solved with respect to n and d after being slightly changed by using $\sin\phi/\sin\phi_1 = n_1$, $\sin\phi/\sin\phi_2 = n_2$, $\sin\phi/\sin\phi_3 = n_3$ in accordance with the Snell's law and a condition equation c paraxially established, which is shown below, thereby obtaining the above-described combined refractive index n and combined thickness d.

(Condition Equation c)

$$\phi = 0$$

While this embodiment has been described with respect to the case where the sheet layer 1 is a polycarbonate layer, the sheet layer 1 may alternatively be a layer of an acrylic resin, a norbornene resin, an ultraviolet curing resin or the like. Also, while the description has been made of the case where the protective layer is constituted by three layers, the same description applies to other cases where the protective layer is constituted by two layers or four or more layers.

Figure 9:
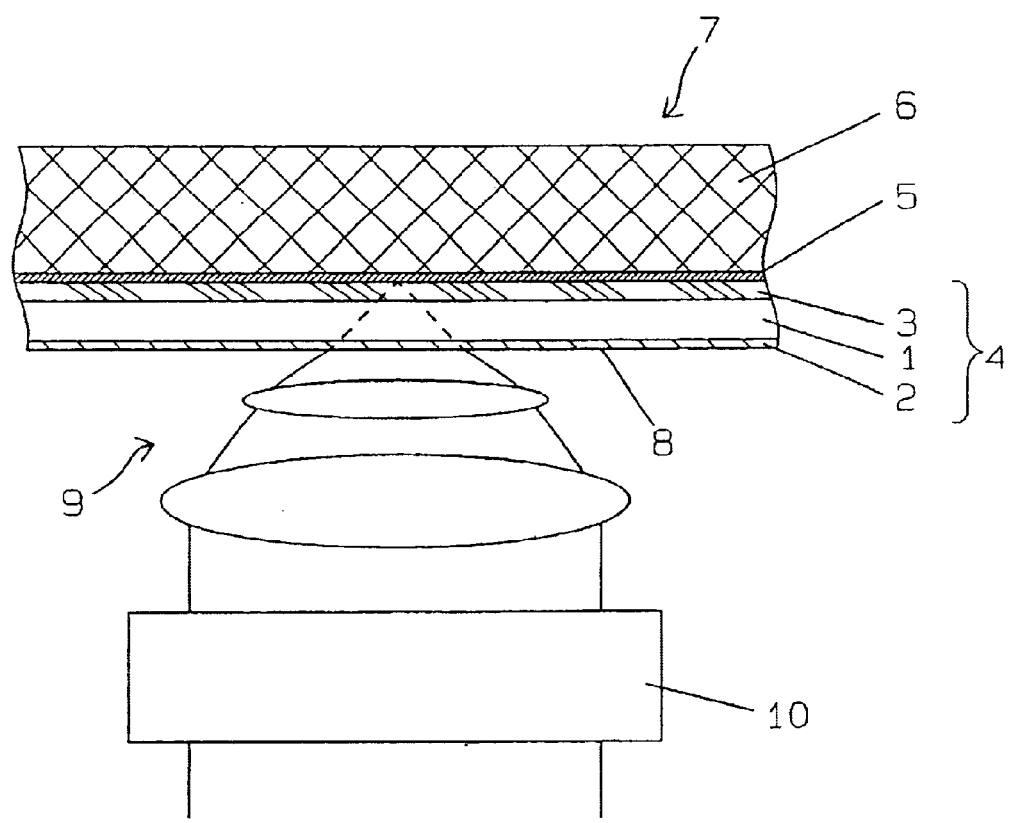
FIG. 9 is a cross-sectional view showing an example of an optical head incorporating a spherical aberration correction element.

In this embodiment of the present invention, $-3 \mu m \leq d - f(n) \leq 3 \mu m$. However, setting $-10 \mu m \leq d - f(n) \leq 10 \mu m$ is effective in a case where recording or reproduction is performed with an optical head incorporating a spherical aberration correction element FIG. 9 shows an example of use of a spherical aberration correction element. A spherical aberration correction element 10 such as the one disclosed in Japanese Patent Laid-Open No. 2000-131603 is placed in the optical path of an optical head.

If variation in thickness of a disk is within the limits of 10 μm, a disk design margin is increased, the yield and productivity are improved, and surface coating, in which limitation of thickness variation to a small value is difficult, is facilitated. If the thickness varies by 10 μm, a spherical aberration of about 100 mλrms occurs. However, such an aberration is corrected by the spherical aberration correction element 10. For example, if variation in thickness through one track on the disk is within the limits of 3 μm and if variation in thickness through the surface is within the limits of 10 μm, a method of use is possible in which DC correction of a radial thickness error is made with the spherical aberration correction element.

(Embodiment 2)

Figure 18:
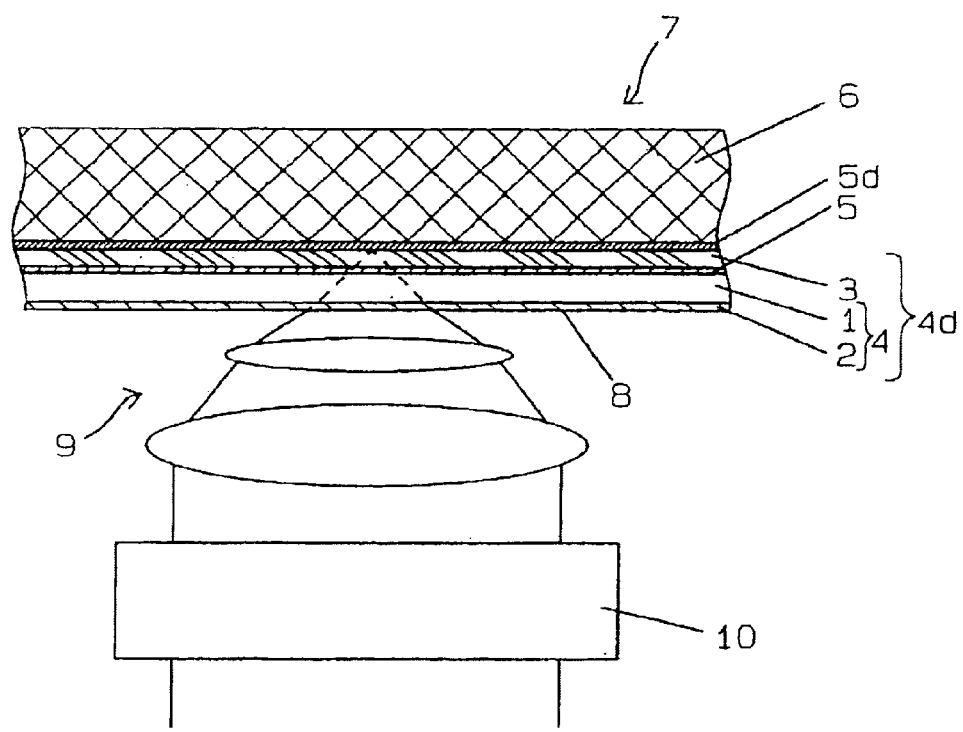
FIG. 18 is a cross-sectional view showing the construction of an optical disk in Embodiment 2 of the present invention.

Embodiment 2 of the present invention will be described with reference to FIG. 18.

An optical disk 7 has a protective layer 4 and 4d, two recording layers 5 and 5d, and a reinforcing substrate 6. Light having a wavelength of 400 to 410 nm is converged by an objective lens 9, and the recording layers 5 and 5d are irradiated with this light on the protective layer 4 side, thereby performing recording and/or reproduction of information. An optical disk having two recording layers has been realized as a DVD. The amount of information can be approximately doubled thereby.

The numerical aperture of the objective lens 9 is large, about 0.85. Therefore two lenses are used as the objective lens 9. The objective lens 9 is designed so that a third-order spherical aberration component of wavefront aberration which occurs when light having a wavelength of 405 nm passes through a light-transmitting flat plate made of polycarbonate or the like and having a refractive index of 1.62 and a thickness of 100 μm is substantially zero. A spherical aberration correction element 10 such as the one disclosed in Japanese Patent Laid-Open No. 2000-131603 is placed in the optical path of the optical head to correct a spherical aberration which occurs due to an error in the thickness of the protective layers 4 and 4d, which is 100 μm.

The recording layers 5 and 5d are films containing a dielectric or reflecting films. The reinforcing substrate 6 prevents the optical disk 7 from being warped or broken. The protective layer 4 protects the recording layer 5 against air. Also, a surface 8 of the optical disk 7 is separated from the recording layer 5 by the protective layer 4 to prevent degradation of recording or reproduction performance due to dust on the surface 8 or scratches in the surface 8.

The protective layer 4 related to the recording layer 5 is constituted by a sheet layer 1 and a coating layer 2. The protective layer 4d related to the recording layer 5d is constituted by the sheet layer 1, the coating layer 2, and an adhesive layer 3.

Polycarbonate or the like is used for the sheet layer 1, an acrylic resin or the like is used for the coating layer 2, and an ultraviolet curing resin or the like is used for the adhesive layer 3. The refractive index of the sheet layer 1 at a wavelength of 405 nm is 1.62, the refractive index of the coating layer 2 at the same wavelength is 1.50, and the refractive index of the adhesive layer 3 at the same wavelength is 1.53.

In the optical disk of the present invention, if the refractive indices of the sheet layer 1, the coating layer 2 and the adhesive layer 3 at a wavelength of 405 nm are $n_1$, $n_2$, and $n_3$, respectively; and the thickness of these layers are $d_1$, $d_2$, and $d_3$ (μm) $1.45 \leq n_1 \leq 1.65$, $1.45 \leq n_2 \leq 1.65$, $1.45 \leq n_3 \leq 1.65$, $1.45 \leq n_3 1.65$, and $f(n) - 10(\mu m) \leq d \leq g(n) + 10 (\mu m)$ are satisfied.

With respect to the protective layer 4, the combined refractive index n and the combined thickness d can be expressed by the following equations 4 and 5.

(Equation 4)

$$n = ((n_1 d_1 + n_2 d_2)/(d_1/n_1 + d_2/n_2))^{0.5}$$

(Equation 5)

$$d = ((n_1 d_1 + n_2 d_2) \times (d_1/n_1 + d_2/n_2))^{0.5}$$

With respect to the protective layer 4d, the combined refractive index n and the combined thickness d can be expressed by the following equations 6 and 7.

(Equation 6)

$$n = ((n_1 d_1 + n_2 d_2 + n_3 d_3)/(d_1/n_1 + d_2/n_2 + d_3/n_3))^{0.5}$$

(Equation 7)

$$d = ((n_1 d_1 + n_2 d_2 + n_3 d_3) \times (d_1/n_1 + d_2/n_2 + d_3/n_3))^{0.5}$$

The combined refractive indices n and combined thickness d are a combined refractive index and a combined thickness specific to the present invention which are obtained by replacing the plurality of layers with one layer equivalent to the plurality of layers. Aberration of light passed through the plurality of layers and aberration of light passed through the one layer equivalent to the plurality of layers are substantially equal to each other.

Derivation of these equations 4 to 7 may be the same as the derivation method described in the description of Embodiment 1.

An expression f(n) and an expression g(n) shown as equations 8 and 9 below are each a third-order approximate curve passing through discrete points at which spherical aberration obtained when combined thickness errors of −15 µm and 15 µm are corrected by the spherical aberration correction element is substantially zero in aberration calculation based on ray tracing. The equations 8 and 9 are design criteria for the combined thicknesses of the protective layers 4 and 4d.

(Equation 8)

$$f(n) = -105.8n^3 + 551.5n^2 - 936.9n + 605.2$$

(Equation 9)

$$g(n) = -138.7n^3 + 723.7n^2 - 1228.7n + 796.0$$

Figure 3:
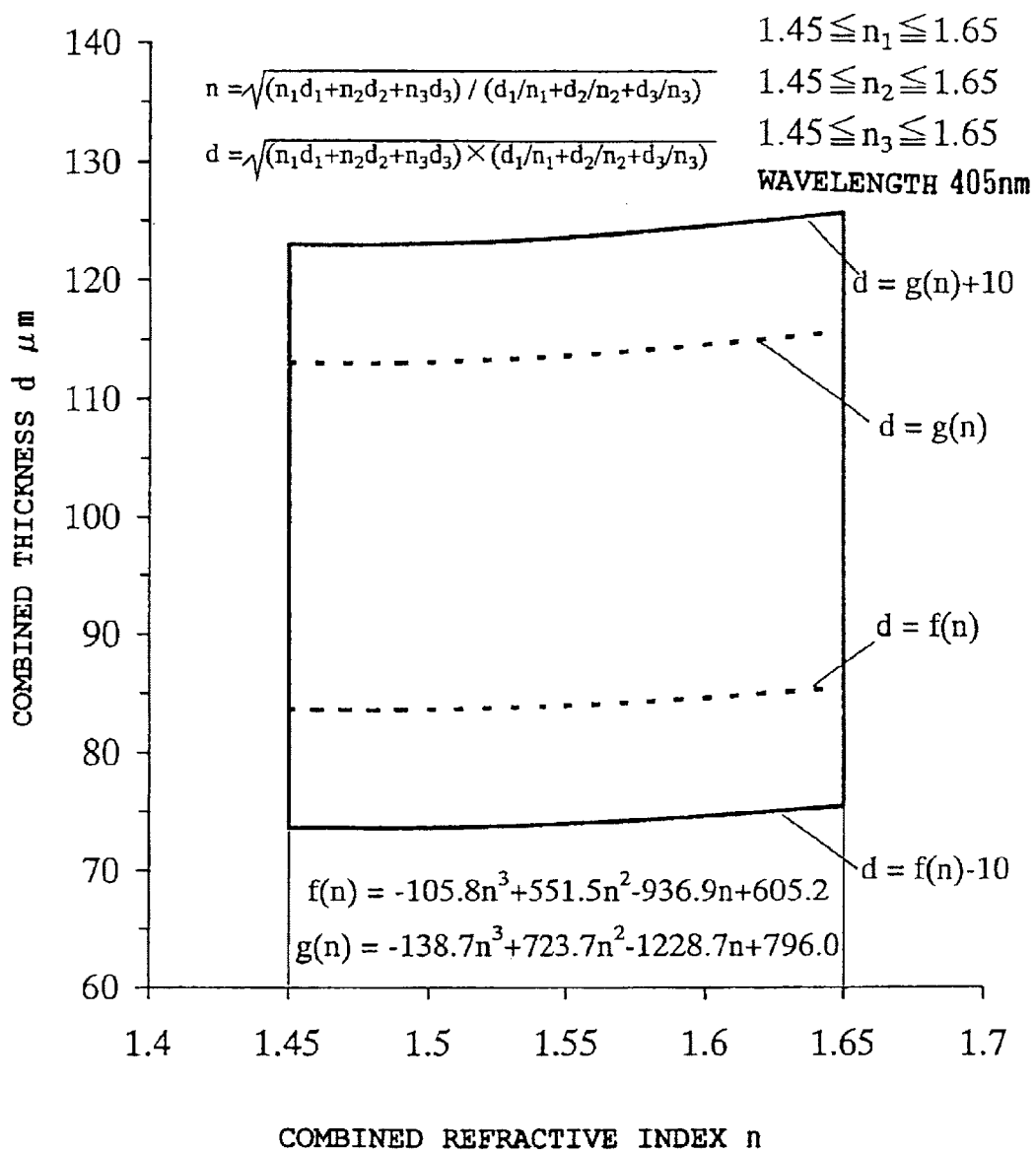
FIG. 3 is a diagram showing the relationship between combined refractive index n and combined thickness d in Embodiment 2 of the present invention.

The combined refractive index n and the combined thickness d satisfying each of these conditions are in the region surrounded by curves and straight lines in FIG. 3. Each of the dotted lines is the curve f(n) or g(n) along which the spherical aberration is substantially zero as a result of correction of thickness errors of ±15 µm by the spherical aberration correction element.

If the combined refractive index n and the combined thickness d obtained from the thicknesses and the refractive indices of the plurality of layers constituting each protective layer are determined within this region (region surrounded by the solid lines in FIG. 3), an optical disk incorporating the spherical aberration correction element can be fabricated in which the spherical aberration is limited substantially to 30 mλrms.

If variation in thickness through one track on the disk is within the limits of 3 µm and if radial thickness error is corrected by DC correction with the spherical aberration correction element, the spherical aberration is limited substantially to 30 mλrms. Correction ability of about ±20 µm in thickness can easily be realized as ability of the spherical aberration correction element.

If the combined thickness of the layer between the first recording layer and the second recording layer is set to 20 µm or larger, this layer functions as a separation layer to separate focus error signals for the two recording layers. The effect of reducing the amount of stray light caused by refraction of the other recording layer can also be obtained.

Thus, in the embodiment of the present invention, the thickness and refractive index of each of the plurality of layers constituting the protective layer are considered to enable fabrication of an optical disk in which occurrence of spherical aberration is limited.

While the description has been made of the case where the sheet layer 1 is a polycarbonate layer, the sheet layer 1 may alternatively be a layer of an acrylic resin, a norbornene resin, an ultraviolet curing resin or the like. Also, while the description has been made of the case where the protective layer is constituted by three layers, the same description applies to other cases where the protective layer is constituted by two layers or four or more layers.

(Embodiment 3)

Embodiment 3 of the present invention will be described with reference to FIG. 9. An optical disk 7 of this embodiment has the same construction as that in Embodiment 1 of the present invention.

In the optical disk 7 of the present invention, if the refractive indices of the sheet layer 1, the coating layer 2 and the adhesive layer 3 at a wavelength of 405 nm are $n_1$, $n_{2a}$, and $n_{2b}$, respectively; the thickness of the sheet layer 1 is $d_1$ (µm); and the thickness of the protective layer 4 is $d_1+d_2$ (µm), $1.45 \leq n_1 \leq 1.65$, $1.50 \leq n_{2a} \leq 1.55$, $1.50 \leq n_{2b} \leq 1.55$, and $-3 \text{ µm} \leq d_1+d_2-f(n_1) \leq 3$ µm are satisfied.

In this expression, $f(n_1) = A \cdot n_1^3 + B \cdot n_1^2 + C \cdot n_1 + D$, $A = 1.280 d_2 - 109.8$, $B = -6.652 d_2 + 577.2$, $C = 11.27 d_2 - 985.5$, and $D = -6.257 d_2 + 648.6$.

An expression $f(n_1)$ is a third-order expression of $n_1$ using coefficients A, B, C, and D each expressed by using $d_2$ as a parameter. Expression $f(n_1)$ expresses a third-order approximate curve passing through discrete points at which spherical aberration is substantially zero in aberration calculation based on ray tracing. The thickness is prescribed within the limits of 3 µm from this curve.

Figure 4:
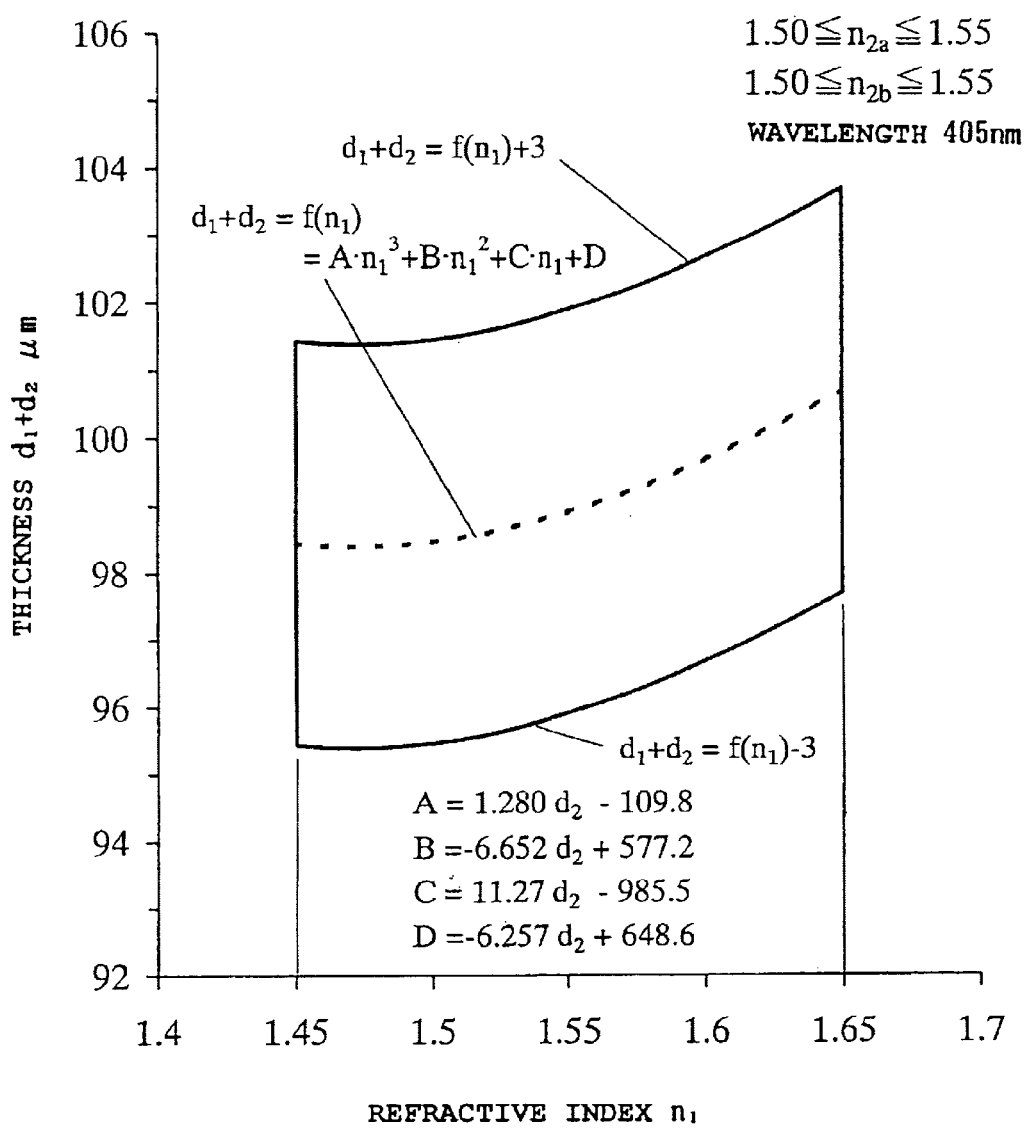
FIG. 4 is a diagram showing the relationship between combined refractive index $n_1$ and thickness $d_1+d_2$ in Embodiment 3 of the present invention.

The refractive index $n_1$ and the thickness $d_1+d_2$ satisfying this condition are in the region surrounded by curves and straight lines in FIG. 4. The dotted line is the curve $f(n_1)$ along which the spherical aberration is substantially zero. This embodiment of the present invention is characterized in that the curve $f(n_1)$ with the thickness $d_2$ used as a parameter is changed by considering the influence of the adhesive layer 3 and the coating layer 2 on the spherical aberration. If the refractive index $n_1$ and the thickness $d_1+d_2$ are determined within this region, an optical disk can be fabricated in which the spherical aberration is limited substantially to 30 mλrms.

Figure 5:
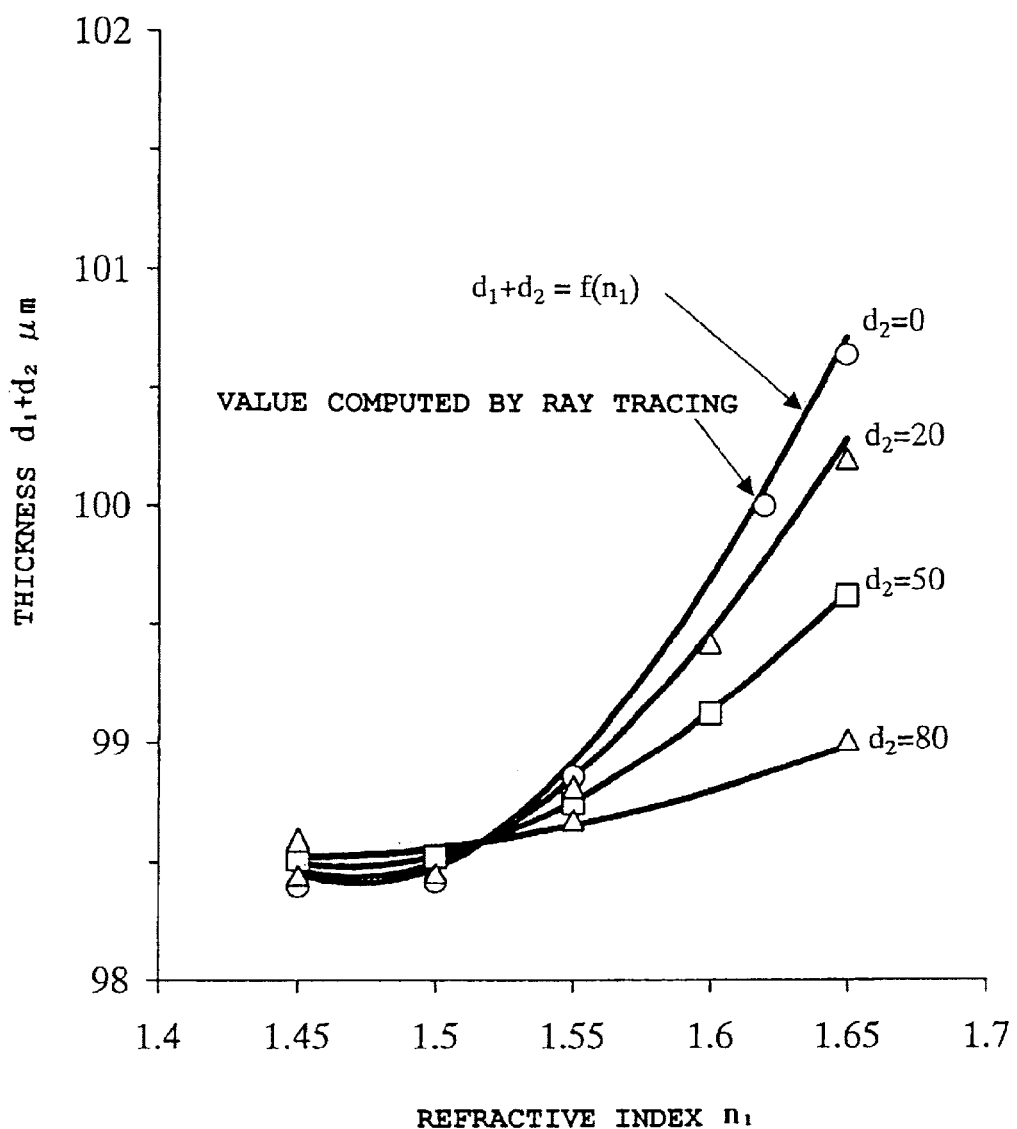
FIG. 5 is a diagram showing the relationship between combined refractive index $n_1$ and thickness $d_1+d_2$ in Embodiment 3 of the present invention.

FIG. 5 shows the curve $d_1+d_2=f(n_1)$ when the value of $d_2$ is changed. Also, points at which spherical aberration is substantially zero in aberration calculation based on ray tracing are plotted. Errors therebetween are 0.1 µm or less and a good match can be recognized therebetween.

Thus, in the embodiment of the present invention, the thickness and refractive index of each of the plurality of layers constituting the protective layer are considered to enable fabrication of an optical disk in which occurrence of spherical aberration is limited.

While the description has been made of the case where the sheet layer 1 is a polycarbonate layer, the sheet layer 1 may alternatively be a layer of an acrylic resin, a norbornene resin, an ultraviolet curing resin or the like. Also, while the description has been made of the case where the protective layer is constituted by three layers, the same description applies to other cases where the protective layer is constituted by two layers or four or more layers.

In this embodiment of the present invention, $-3 \text{ µm} \leq d_1+d_2-f(n_1) \leq 3 \text{ µm}$. However, setting $-10 \text{ µm} \leq d_1+d_2-f(n_1) \leq 10$ µm is effective in a case where recording or reproduction is performed with an optical head incorporating a spherical aberration correction element. FIG. 9 shows an example of use of a spherical aberration correction element. A spherical aberration correction element 10 such as the one disclosed in Japanese Patent Laid-Open No. 2000-131603 is placed in the optical path of an optical head.

If variation in thickness of a disk is within the limits of 10 µm, a disk design margin is increased, the yield and productivity are improved, and surface coating, in which limitation of thickness variation to a small value is difficult, is facilitated. If the thickness varies by 10 µm, a spherical aberration of about 100 mλrms occurs. However, such an aberration is corrected by the spherical aberration correction element 10. For example, if variation in thickness through one track on the disk is within the limits of 3 µm and if variation in thickness through the surface is within the limits of 10 μm, a method of use is possible in which DC correction of a radial thickness error is made with the spherical aberration correction element.

(Embodiment 4)

Embodiment 4 of the present invention will be described with reference to FIG. 9. An optical disk 7 of this embodiment has the same construction as that in Embodiment 1 of the present invention.

In the optical disk 7 of the present invention, if the refractive indices of the sheet layer 1, the coating layer 2 and the adhesive layer 3 at a wavelength of 405 nm are $n_1$, $n_{2a}$, and $n_{2b}$, respectively; the thickness of the sheet layer 1 is $d_1$ (μm); and the thickness of the protective layer 4 is $d_1+d_2$ (μm), $1.61 \leq n_1 \leq 1.63$, $1.50 \leq n_{2a} \leq 1.55$, $1.50 \leq n_{2b} \leq 1.55$, and $-3 \mu m \leq d_2-f(d_1) \leq 3 \mu m$ are satisfied. Expression $f(d_1)$ is $f(d_1)=0.986d_1+98.6$, which is an approximate straight line passing through discrete points at which spherical aberration is substantially zero in aberration calculation based on ray tracing.

Figure 6:
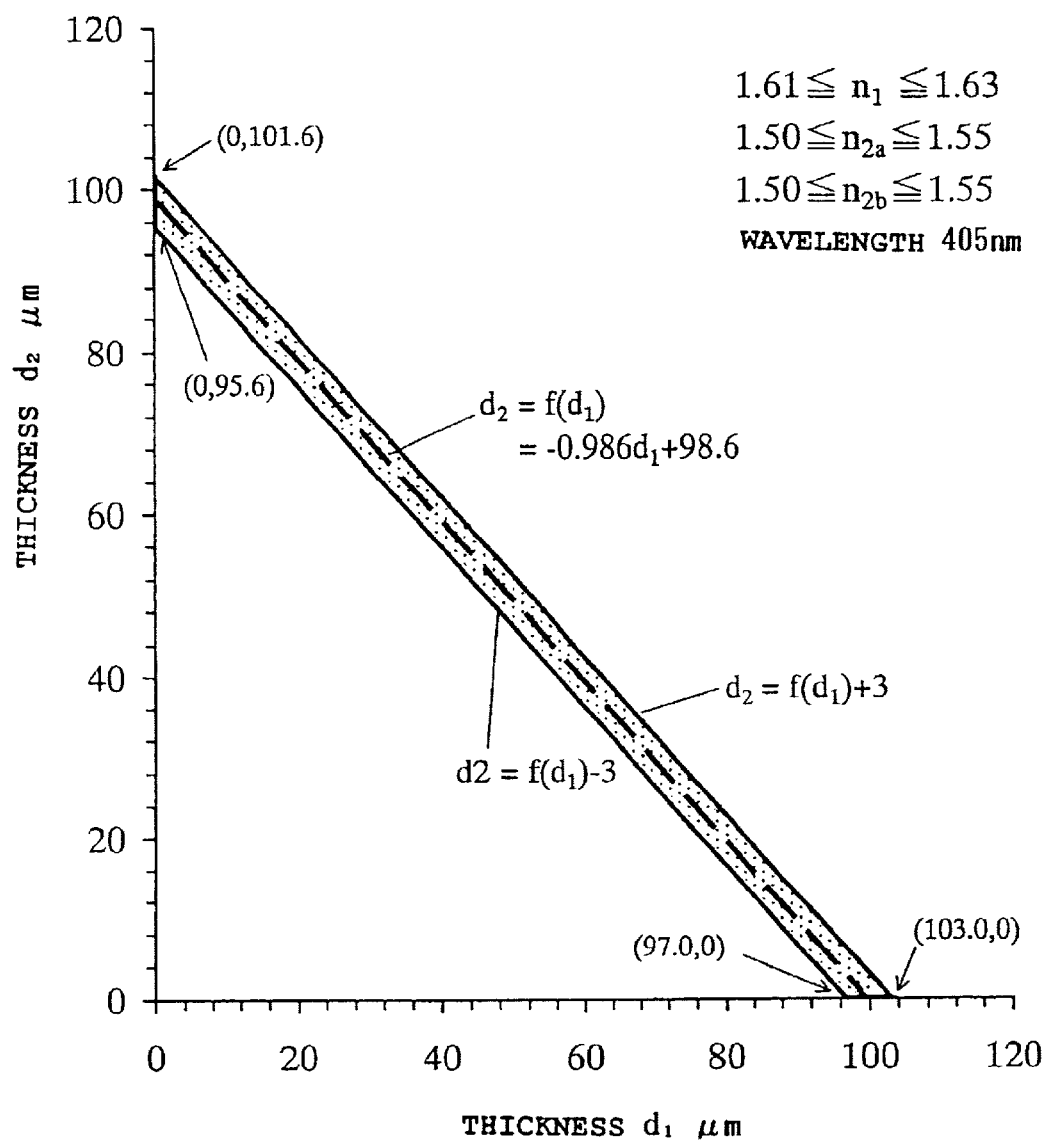
FIG. 6 is a diagram showing the relationship between thickness $d_1$ and thickness $d_2$ in Embodiment 4 of the present invention.

The thicknesses $d_1$ and $d_2$ satisfying this condition are in the hatched region in FIG. 6. If the thicknesses $d_1$ and $d_2$ are determined within this region, an optical disk can be fabricated in which the spherical aberration is limited substantially to 30 mλrms.

This embodiment of the present invention is effective in the case where polycarbonate or the like is used for the sheet layer 1. While the description has been made of the case where the protective layer is constituted by three layers, the same description applies to other cases where the protective layer is constituted by two layers or four or more layers.

In this embodiment of the present invention, $-3 \mu m \leq d_2-f(d_1) \leq 3 \mu m$. However, setting $-10 \mu m \leq d_2-f(d_1) \leq 10 \mu m$ is effective in a case where recording or reproduction is performed with an optical head incorporating a spherical aberration correction element.

(Embodiment 5)

Embodiment 5 of the present invention will be described with reference to FIG. 9. An optical disk 7 of this embodiment has the same construction as that in Embodiment 1 of the present invention.

In the optical disk 7 of the present invention, if the refractive indices of the sheet layer 1, the coating layer 2 and the adhesive layer 3 at a wavelength of 405 nm are $n_1$, $n_{2a}$, and $n_{2b}$, respectively; the thickness of the sheet layer 1 is $d_1$ (μm); and the thickness of the protective layer 4 is $d_1+d_2$ (μm), $1.49 \leq n_1 \leq 1.51$, $1.50 \leq n_{2a} \leq 1.55$, $1.50: n_{2b} \leq 1.55$, and $-3 \mu m \leq d_2-f(d_1) \leq 3 \mu m$ are satisfied. Expression $f(d_1)$ is $f(d_1)=-1.002d_1+98.6$, which is an approximate straight line passing through discrete points at which spherical aberration is substantially zero in aberration calculation based on ray tracing.

Figure 7:
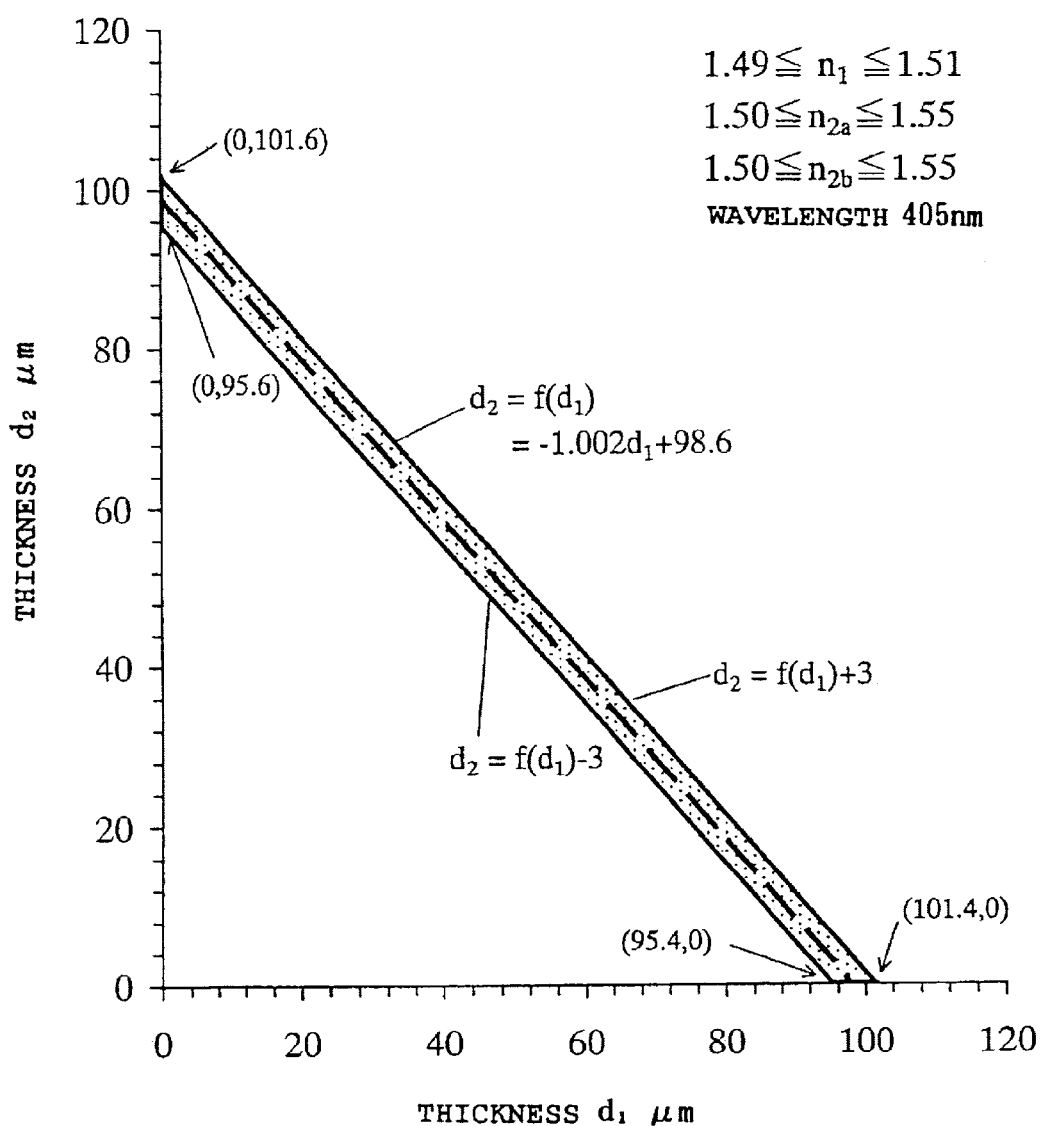
FIG. 7 is a diagram showing the relationship between thickness $d_1$ and thickness $d_2$ in Embodiment 5 of the present invention.

The thicknesses $d_1$ and $d_2$ satisfying this condition are in the hatched region in FIG. 7. If the thicknesses $d_1$ and $d_2$ are determined within this region, an optical disk can be fabricated in which the spherical aberration is limited substantially to 30 mλrms.

The embodiment of the present invention is effective in the case where an acrylic resin or the like is used for the sheet layer 1. While the description has been made of the case where the protective layer is constituted by three layers, the same description applies to other cases where the protective layer is constituted by two layers or four or more layers.

In this embodiment of the present invention, $-3 \mu m \leq d_2-f(d_1) \leq 3 \mu m$. However, $-10 \mu m \leq d_2-f(d_1) \leq 10 \mu m$ is effective in a case where recording or reproduction is performed with an optical head incorporating a spherical aberration correction element.

(Embodiment 6)

Embodiment 6 of the present invention will be described with reference to FIG. 9. An optical disk 7 of this embodiment has the same construction as that in Embodiment 1 of the present invention.

In the optical disk 7 of the present invention, if the refractive indices of the sheet layer 1, the coating layer 2 and the adhesive layer 3 at a wavelength of 405 nm are $n_1$, $n_{2a}$, and $n_{2b}$, respectively; the thickness of the sheet layer 1 is $d_1$ (μm); and the thickness of the protective layer 4 is $d_1+d_2$ (μm), $1.52 \leq n_1 \leq 1.54$, $1.50 \leq n_{2a} \leq 1.55$, $1.50 \leq n_{2b} \leq 1.55$, and $-3 \mu m \leq d_2-f(d_1) \leq 3 \mu m$ are satisfied.

Expression $f(d_1)$ is $f(d_1)=-d_1+98.6$, which is an approximate straight line passing through discrete points at which spherical aberration is substantially zero in aberration calculation based on ray tracing.

Figure 8:
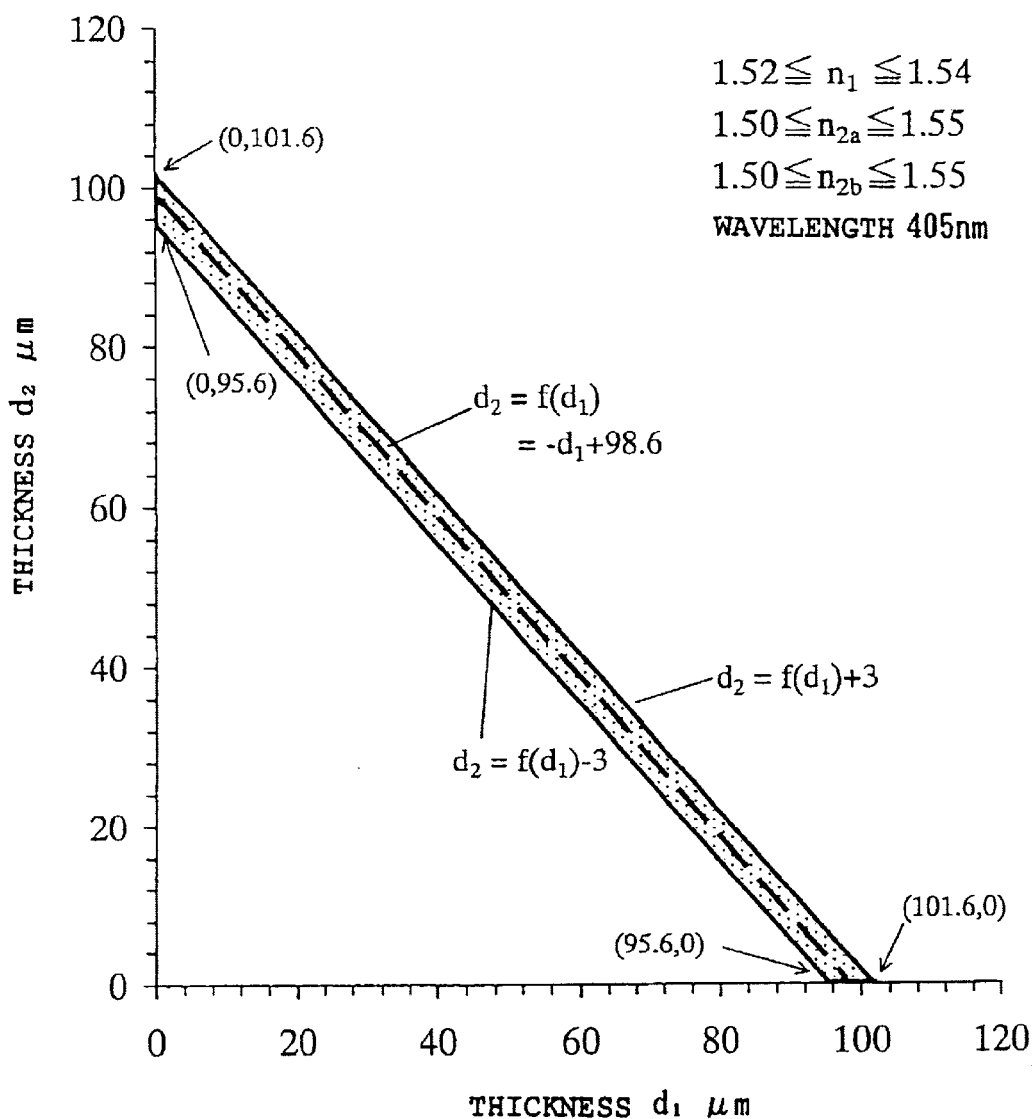
FIG. 8 is a diagram showing the relationship between thickness $d_1$ and thickness $d_2$ in Embodiment 6 of the present invention.

The thicknesses $d_1$ and $d_2$ satisfying this condition are in the hatched region in FIG. 8. If the thicknesses $d_1$ and $d_2$ are determined within this region, an optical disk can be fabricated in which the spherical aberration is limited substantially to 30 mλrms.

The embodiment of the present invention is effective in the case where a norbornene resin or the like is used for the sheet layer 1. While the description has been made of the case where the protective layer is constituted by three layers, the same description applies to other cases where the protective layer is constituted by two layers or four or more layers.

In this embodiment of the present invention, $-3 \mu m \leq d_2-f(d_1) \leq 3 \mu m$. However, setting $-10 \mu m \leq d_2-f(d_1) \leq 10 \mu m$ is effective in a case where recording or reproduction is performed with an optical head incorporating a spherical aberration correction element.

Needless to say, the sheet layer 1 in Embodiments 1 to 6 of the present invention may be a layer of an ultraviolet curing resin.

(Embodiment 7)

Figure 10:
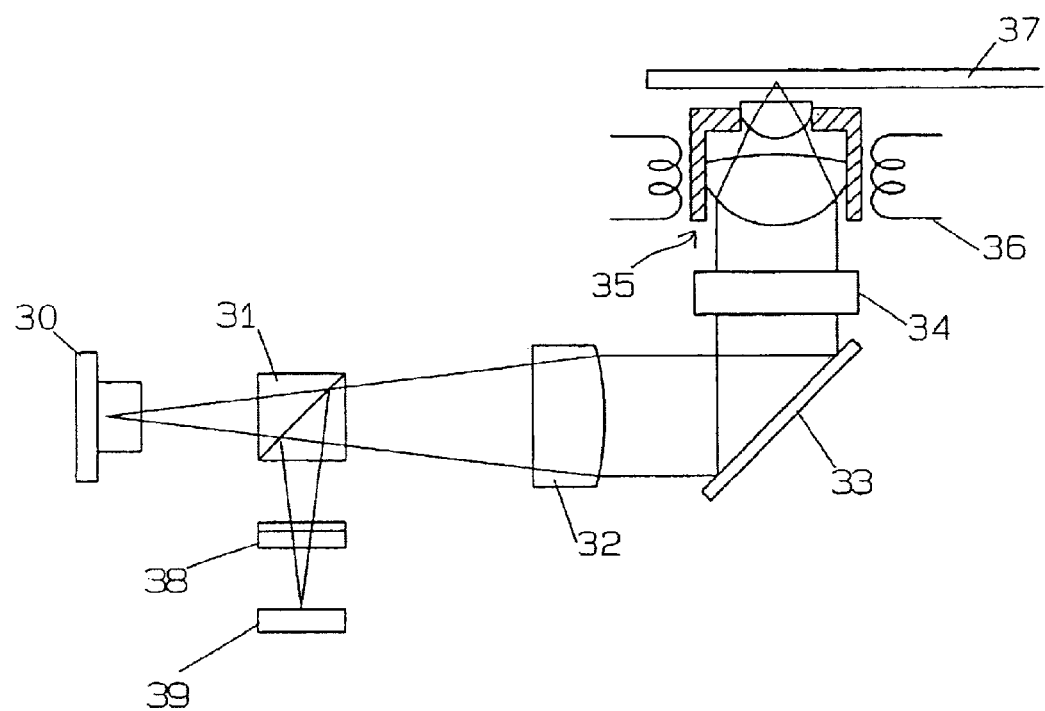
FIG. 10 is a diagram showing recording on or reproduction from an optical disk with an optical head incorporating a spherical aberration correction element.

FIG. 10 shows an example of the method of recording on or reproduction from the optical disk in accordance with one of Embodiments 1 to 6 by using an optical head incorporating a spherical aberration correction element.

Approximately half of light emitted from a semiconductor laser 30 and having a wavelength of 405 nm passes through a prism 31 and is collimated by the condenser lens 32 to become an approximately parallel beam of light. The collimated beam is reflected by a mirror 33, passes through a spherical aberration correction element 34, is converged by an objective lens 35 having a numerical aperture of 0.85, and forms a light spot on the recording layer of an optical disk 37 of the present invention.

The light reflected by the recording layer again passes through the objective lens 35 and the spherical aberration correction element 34, is reflected by the mirror 33, and is focused by the condenser lens 32. Approximately half of the focused light is reflected by the prism 31, passes through the cylindrical lens 38 and is detected by a photodetector 39.

The photodetector 39 is arranged to detect a reproduction signal, a focus control signal for enabling the objective lens 35 to follow the recording layer of the optical disk 37 by an astigmatism method, and a tracking control signal for enabling the objective lens 35 to follow a track on the optical disk 37 by a phase difference method or a push-pull method. The objective lens 35 is driven in a focusing direction and in a tracking direction by an objective lens driver 36 on the basis of these control signals.

The spherical aberration correction element 34 is, for example, one such as disclosed in Japanese Patent Laid- Open No. 2000-131603. The spherical aberration correction element 34 optimizes the light spot formed on the recording layer of the optical disk 37 by correcting spherical aberrations which occur due to a thickness error and a refractive index error in the protective layer of the optical disk 37. Correction of a protective layer thickness error of ±20 µm by the spherical aberration correction element 34 can easily be realized. If variation in thickness through one track on the disk is within the limits of 3 µm, the resulting spherical aberration can be limited to 30 mλrms by performing DC correction of the radial thickness error by the spherical aberration correction element 34.

The spherical aberration correction element 34 is constituted by two lenses. The distance between the two lenses is changed in the direction of the optical axis to reduce the degree of divergence or convergence of light incident on the objective lens 35, thereby correcting the spherical aberration.

The entire disclosure of Japanese Patent Laid-Open No. 2000-131603 are incorporated herein by reference in its entirety.

Thus, when recording on or reproduction from the optical disk of the present invention is performed with the optical head incorporating a spherical aberration correction element, the spherical aberration can be limited substantially to 30 mλrms, thereby realizing an improvement in information density as never before possible.

According to the present invention, design margins with respect to the thickness and refractive index of the optical disk are increased and the yield and productivity are improved.

Also, surface coating, in which limitation of thickness variation to a small value is difficult, is facilitated.

Further, the effect of further increasing the density can be achieved by providing two recording layers.

(Embodiment 8)

Figure 11:
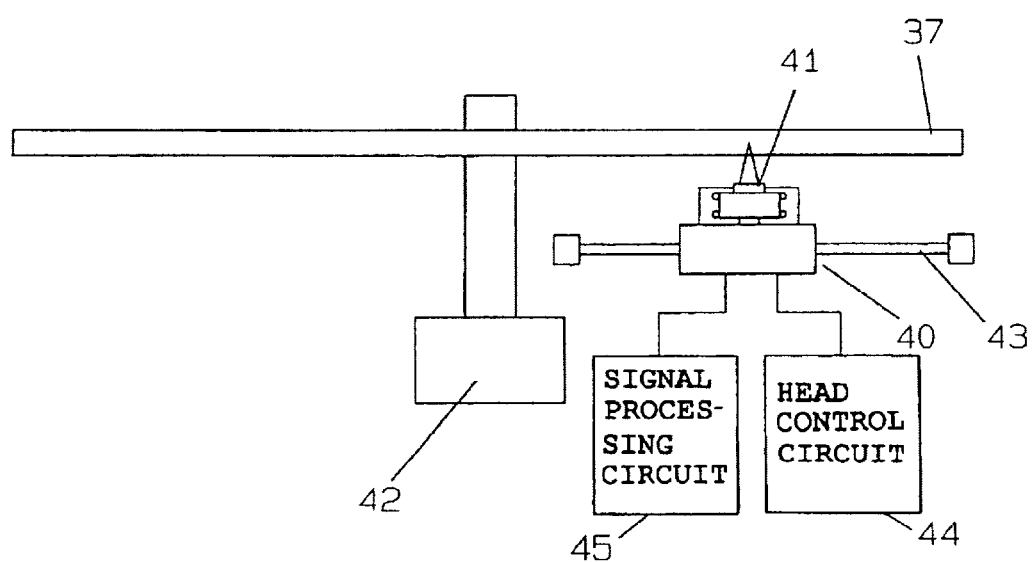
FIG. 11 is a diagram showing an optical information recording/reproduction apparatus of the present invention.
Figure 12:
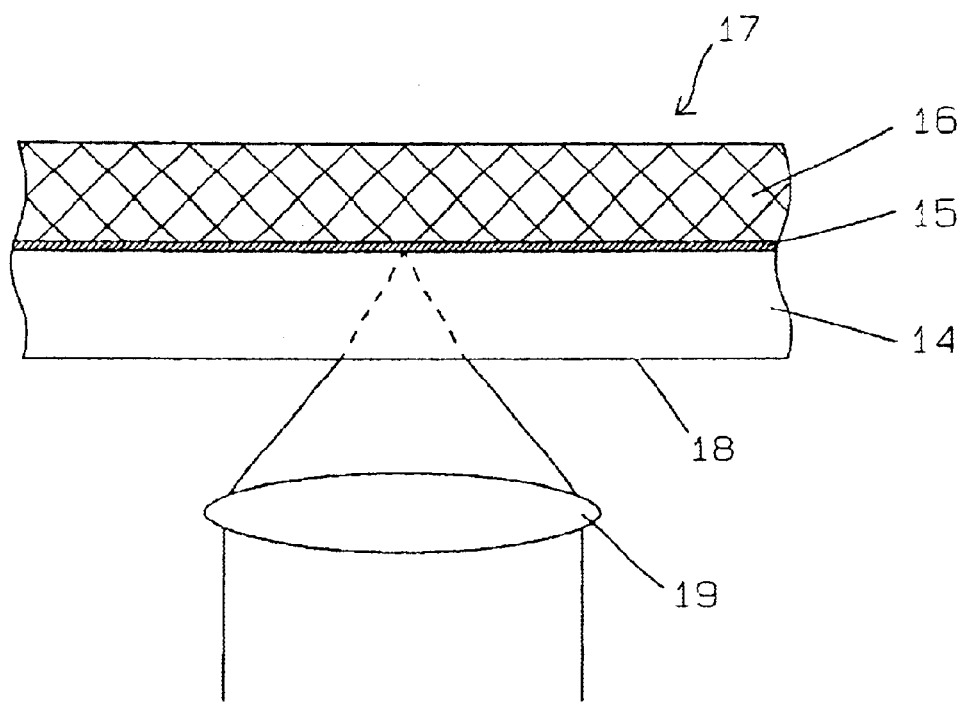
FIG. 12 is a cross-sectional view showing the construction of a conventional optical disk.
Figure 13:
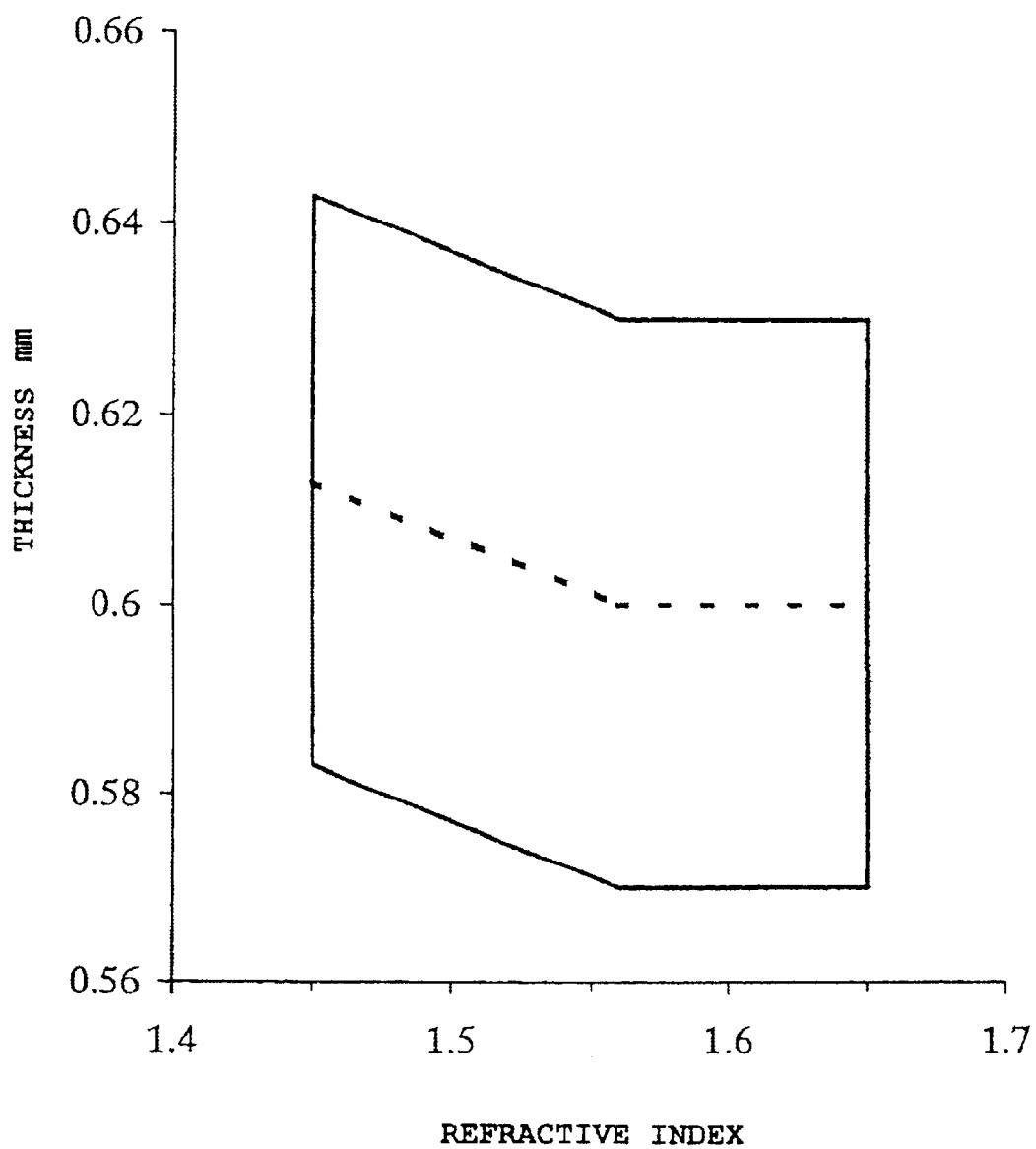
FIG. 13 is a diagram showing the relationship between the refractive index and the thickness of the conventional optical disk.
Figure 14:
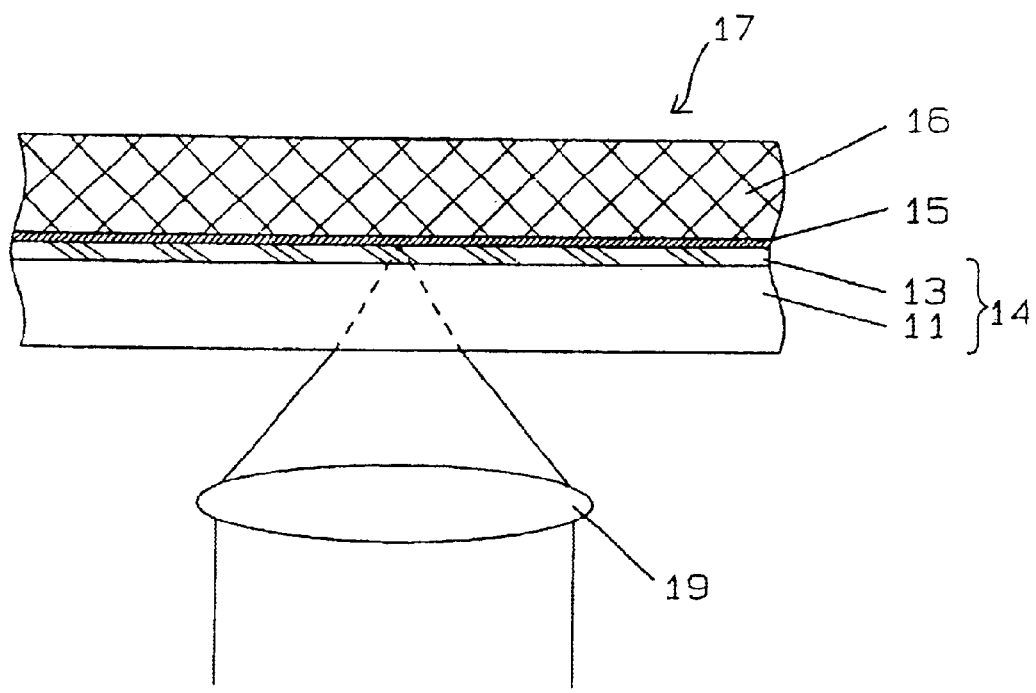
FIG. 14 is a cross-sectional view showing the construction of a conventional optical disk.
Figure 15:
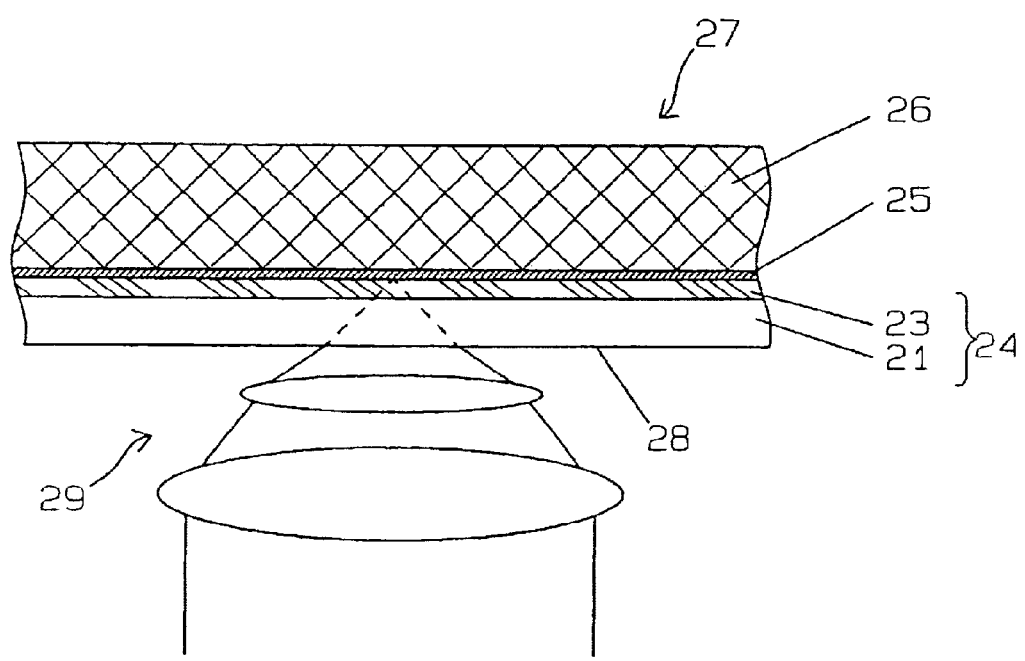
FIG. 15 is a cross-sectional view showing the construction of a high-density optical disk.

FIG. 11 is a diagram schematically showing an embodiment of the optical information recording/reproduction apparatus of the present invention.

An optical disk 37 is the optical disk in accordance with one of Embodiments 1 to 6. The optical disk 37 is rotated by a motor 42. An optical head 40 is moved in a radial direction of the optical disk 37 along a shaft 43.

For recording or reproduction of information, light emergent from a semiconductor laser of the optical head 40 is converged to the recording layer of the optical disk 37 by an objective lens 41. A photodetector of the optical head 40 detects a focus control signal for enabling the objective lens 41 to follow the surface of the optical disk 37, and a tracking control signal for enabling the objective lens 41 to follow an information track on the optical disk 37.

A head control circuit 44 performs focus control and tracking control on the optical head 40 on the basis of these control signals.

A signal processing circuit 45 records information on the optical disk 37 through the optical head 40 at the time of recording, and reproduces optical information recorded on the information track on the optical disk 37 from a signal output from the photodetector of the optical head 40 at the time of reproduction.

The optical information recording/reproduction apparatus of the present invention sufficiently reduces the spherical aberration in the spot formed on the recording layer of the optical disk 37 to achieve an increase in information density.

A spherical aberration correction element such as the one disclosed in Japanese Patent Laid-Open No. 2000-131603 is incorporated in the optical head 40 to effectively reduce the spherical aberration even if the optical disk has large variation in thickness of the protective layer or has two recording layers, thus enabling normal information recording and reproduction.

The optical information recording medium of the present invention can be applied in the same manner to either of a type capable of recording and reproduction of optical information and a reproduction-only type.

While the embodiments of the present invention have been described with respect to the case where the predetermined wavelength is 405 nm, light having a wavelength other than this, e.g., a wavelength in the range from 400 to 410 nm, or any other wavelength may be used.

Also, while the embodiments have been described with respect to the case where the two recording layers are provided, the above-described invention can also be applied to the case where two or more recording layers are provided in a similar manner by modifying, according to the number of recording layers, the arrangement in the case where two recording layers are provided.

Also, while the embodiments have been described with respect to the case where expression f(n), expression g(n) or the like representing an approximate curve passing through points at which spherical aberration is substantially zero is used as a design criterion relating to the combined thickness of the protective layer, the coefficients, the order, etc. of the expression representing the approximate curve are not limited to those described above. In short, an approximate curve or straight line passing through points at which spherical aberration is substantially zero in aberration calculation based on ray tracing may suffice as a relational expression used as a design criterion. The degree of approximation etc. may be freely selected according to purposes.

As described above, there is provided a method of designing an optical information recording medium having a recording layer and a protective layer including at least first to mth layers (m≧2) wherein if i is an integer satisfying 1≦i≦m; the refractive index of the ith layer in the protective layer at a predetermined wavelength is $n_i$; and the thickness of the ith layer is $d_i$, (a) a combined refractive index n of one layer substantially equivalent to the plurality of layers constituting the protective layer and substituted for the plurality of layers is specified as $n=((n_1d_1+n_2d_2+ \ldots + n_md_m)/(d_1/n_1+d_2/n_2+ \ldots +d_m/n_m))^{0.5}$, (b) a combined thickness d of the one layer is specified as $d=((n_1d_1+n_2d_2+ \ldots +n_md_m)\times(d_1/n_1+d_2/n_2+ \ldots +d_m/n_m))^{0.5}$, and (c) a relational expression f(n) representing a relationship between the combined refractive index n and the combined thickness d such that spherical aberration is substantially zero is specified as a design criterion relating to the combined thickness of the optical information recording medium, and wherein the refractive index $n_i$ and the thickness $d_i$ of each layer are determined on the basis of the relational expression f(n). This optical information recording medium design method has the effects described below.

That is, according to the above-described design method, the combination of the refractive index $n_i$ and the thickness $d_i$ of each layer can easily be selected from a multiplicity of candidate combinations of $n_i$ and $d_i$ satisfying the predetermined relational expression prescribed as a design criterion as described above, or the like to reduce the initial residual spherical aberration substantially to zero. Therefore, even if variation in thickness of the protective layer to ±3 µm is tolerated, it is possible to limit the spherical aberration in the optical disk substantially to 30 mλrms.

Also, the range of selection of various parameters including the refractive index $n_i$ and the thickness $d_i$ of each layer is thereby extended to increase the degree of design freedom.

As described above, the present invention has the advantage of further reducing spherical aberration in an optical information recording medium having a protective layer constituted by a plurality of layers in comparison with in the conventional art, and thereby enabling normal recording and/or reproduction.

FIG. 2
1 COMBINED THICKNESS
2 COMBINED REFRACTIVE INDEX
3 WAVELENGTH.

FIG. 3
1 COMBINED THICKNESS
2 COMBINED REFRACTIVE INDEX
3 WAVELENGTH.

FIG. 4
1 THICKNESS
2 REFRACTIVE INDEX
3 WAVELENGTH.

FIG. 5
1 THICKNESS
2 REFRACTIVE INDEX
3 VALUE COMPUTED BY RAY TRACING.

FIG. 6
1 THICKNESS
2 WAVELENGTH.

FIG. 7
1 THICKNESS
2 WAVELENGTH.

FIG. 8
1 THICKNESS
2 WAVELENGTH.

FIG. 11
44 HEAD CONTROL CIRCUIT
45 SIGNAL PROCESSING CIRCUIT.

FIG. 13
1 THICKNESS
2 REFRACTIVE INDEX.

Figure 16:
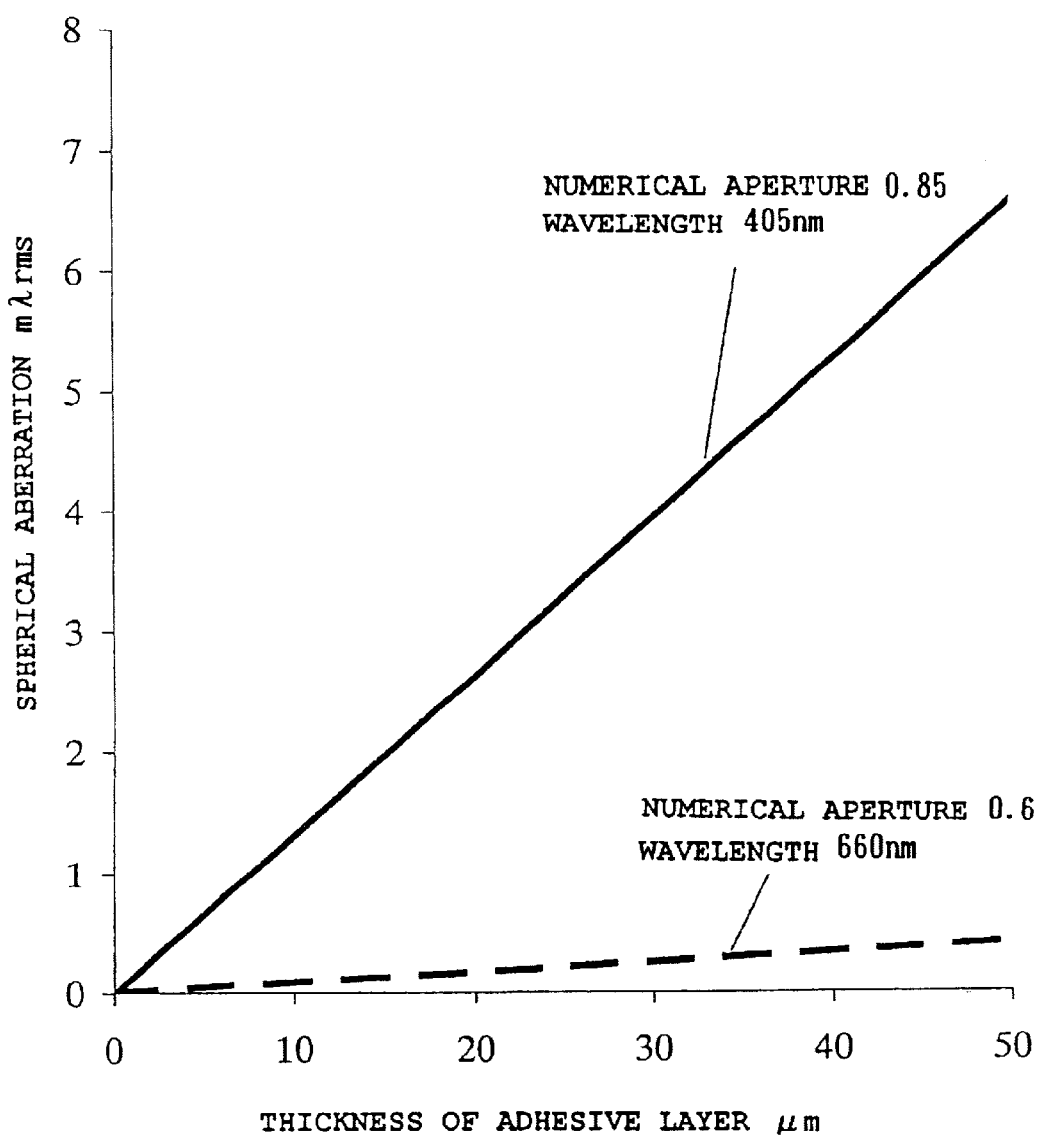
FIG. 16 is a diagram showing the relationship between the thickness of an adhesive layer and spherical aberration.

FIG. 16
1 SPHERICAL ABERRATION
2 THICKNESS OF ADHESIVE LAYER
3 NUMERICAL APERTURE
   Wavelength

What is claimed is:

1. An optical information recording medium comprising at least first and second recording layers, and a protective layer including a plurality of layers, wherein when first to kth layers ($k \geq 2$) in the plurality of layers in the protective layer between a surface of the optical information recording medium and the first recording layer are specified as a first protective layer, and first to mth layers ($m > k$) in the plurality of layers in the protective layer between the surface of the optical information recording medium and the second recording layer are specified as a second protective layer, when i is an integer satisfying $1 \leq i \leq m$; the refractive index of the ith layer in the protective layer at a wavelength of 405 nm is $n_i$; and the thickness of the ith layer is $d_i$, when (a-1) a combined refractive index n of one layer which is substantially equivalent to the first protective layer and substituted for the first protective layer is specified as $n = ((n_1 d_1 + n_2 d_2 + \ldots + n_k d_k)/(d_1/n_1 + d_2/n_2 + \ldots + d_k/n_k))^{0.5}$; (b-1) a combined thickness d of said one layer is specified as $d = ((n_1 d_1 + n_2 d_2 + \ldots + n_k d_k) \times (d_1/n_1 + d_2/n_2 + \ldots + d_k/n_k))^{0.5}$; and (c-1) an expression f(n): $f(n) = -105.8n^3 + 551.5n^2 - 936.9n + 605.2$ is specified as a design criterion relating to the thickness of the first protective layers; and when (a-2) a combined refractive index n of one layer which is substantially equivalent to the second protective layer and substituted for the second protective layer is specified as $n = ((n_1 d_1 + n_2 d_2 + \ldots + n_m d_m)/(d_1/n_1 + d_2/n_2 + \ldots + d_m/n_m))^{0.5}$; (b-2) a combined thickness d of said one layer is specified as $d = ((n_1 d_1 + n_2 d_2 + \ldots + n_m d_m) \times (d_1/n_1 + d_2/n_2 + \ldots + d_m/n_m))^{0.5}$; and (c-2) an expression g(n): $g(n) = -138.7n^3 + 723.7n^2 - 1228.7n + 796.0$ is specified as a design criterion relating to the thickness of the second protective layers, the refractive index $n_i$ of the ith layer and the combined refractive index n of the first and second protective layers is equal to or larger than 1.45 and equal to or smaller than 1.65, a difference $d - f(n)$ between the combined thickness d of the first protective layer and the design criterion expression f(n) is equal to or larger than $-10$ μm, and a difference $d - g(n)$ between the combined thickness d of the second protective layer and the design criterion expression g(n) is equal to or smaller than 10 μm.

2. An optical information recording medium comprising a recording layer, and a protective layer including at least two layers, wherein when a refractive index of a particular one of the layers in the protective layer at a wavelength of 405 nm is $n_1$; a thickness of the particular one of the layers is $d_1$ (μm); and a thickness of the layers in the protective layer other than the particular one layer is $d_2$ (μm), when (a) equations A, B, C, and D including said $d_2$ are specified as $A = 1.280 d_2 - 109.8$, $B = -6.652 d_2 + 577.2$, $C = 11.27 d_2 - 985.5$, and $D = -6.257 d_2 + 648.6$, and (b) an expression f ($n_1$): $f(n_1) = A \cdot n_1^3 + B \cdot n_1^2 + C \cdot n_1 + D$ is specified as a design criterion relating to the thickness of the protective layer, the refractive index $n_i$ is equal to or larger than 1.45 and equal to or smaller than 1.65, a refractive index of the layers in the protective layer other than said particular one layer at a wavelength of 405 nm is equal to or larger than 1.50 and equal to or smaller than 1.55, and a value of $d_1 + d_2 - f(n_1)$ is equal to or larger than $-10$ μm and equal to or smaller than 10 μm.

3. The optical information recording medium according to claim 2, wherein the value of $d_1 + d_2 - f(n_1)$ is equal to or larger than $-3$ μm and equal to or smaller than 3 μm.

4. An optical information recording medium comprising a recording layer, and a protective layer including at least two layers, wherein when a thickness of a particular one of the layers in the protective layer is $d_1$ (μm); a thickness of the layers in the protective layer other than said particular one layer is $d_2$ (μm); and an equation $f(d_1)$ including said $d_1$ is specified as $f(d_1) = -0.986 d_1 + 98.6$, a refractive index of said particular one layer at a wavelength of 405 nm is equal to or larger than 1.61 and equal to or smaller than 1.63, a refractive index of the layers in the protective layer other than said particular one layer at the wavelength 405 nm is equal to or larger than 1.50 and equal to or smaller than 1.55, and a value of $d_2 - f(d_1)$ is equal to or larger than $-10$ μm and equal to or smaller than 10 μm.

5. The optical information recording medium according to claim 4, wherein the value of $d_2 - f(d_1)$ is equal to or larger than $-3$ μm and equal to or smaller than 3 μm.

6. An optical information recording medium comprising a recording layer, and a protective layer including at least two layers, wherein when a thickness of a particular one of the layers in the protective layer is $d_1$ (μm); a thickness of the layers in the protective layer other than said particular one layer is $d_2$ (μm); and an equation $f(d_1)$ including said $d_1$ is specified as $f(d_1)=-1.002d_1+98.6$, a refractive index of said particular one layer at a wavelength of 405 nm is equal to or larger than 1.49 and equal to or smaller than 1.51, a refractive index of the layers in the protective layer other than said particular one layer at the wavelength 405 nm is equal to or larger than 1.50 and equal to or smaller than 1.55, and a value of $d_2-f(d_1)$ is equal to or larger than −10 μm and equal to or smaller than 10 μm.

7. The optical information recording medium according to claim 6, wherein the value of $d_2-f(d_1)$ is equal to or larger than −3 μm and equal to or smaller than 3 μm.

8. An optical information recording medium comprising a recording layer, and a protective layer including at least two layers, wherein when a thickness of a particular one of the layers in the protective layer is $d_1$(μm); a thickness of the layers in the protective layer other than said particular one layer is $d_2$ (μm); and an equation $f(d_1)$ including said $d_1$ is specified as $f(d_1)=-d_1+98.6$, a refractive index of said particular one layer at a wavelength of 405 nm is equal to or larger than 1.52 and equal to or smaller than 1.54, a refractive index of the layers in the protective layer other than said particular one layer at the wavelength 405 nm is equal to or larger than 1.50 and equal to or smaller than 1.55, and a value of $d_2-f(d_1)$ is equal to or larger than −10 μm and equal to or smaller than 10 μm.

9. The optical information recording medium according to claim 8, wherein the value of $d_2-f(d_1)$ is equal to or larger than −3 μm and equal to or smaller than 3 μm.

10. An optical information recording medium comprising a recording layer, and a protective layer including at least first to mth layers (m≧2), wherein when i is an integer satisfying 1≦i≦m; a refractive index of the ith layer in the protective layer at a predetermined wavelength is $n_i$; and a thickness of the ith layer is $d_i$, and when (a) a combined refractive index n of one layer which is substantially equivalent to the plurality of layers constituting the protective layer and substituted for the plurality of layers is specified as $n=((n_1d_1+n_2d_2+ \ldots +n_md_m)/(d_1/n_1+d_2/n_2+ \ldots +d_m/n_m))^{0.5}$; (b) a combined thickness d of said one layer is specified as $d=((n_1d_1+n_2d_2+ \ldots + n_md_m) \times (d_1/n_1+d_2/n_2+ \ldots +d_m/n_m))^{0.5}$; and (c) an expression $f(n)$ which has the combined refractive index n as a variable, and which is one of $f(n)=-109.8n^3+577.2n^2-985.5n+648.6$, $f(n)=-105.8n^3+551.5n^2-936.9n+605.2$, and $f(n)=-138.7n^3+723.7n^2-1228.7n+796.0$ is specified as a design criterion relating to the combined thickness of the optical information recording medium, a difference between the combined thickness d and the design criterion expression $f(n)$ is equal to or larger than −10 μm and equal to or smaller than 10 μm.

11. An optical information recording/reproduction method comprising performing at least one of recording and reproduction of information on the optical information recording medium according to claims 2, 4, 6, 8, or 10 by using an optical head having aberration correction means of correcting aberration which occurs due to the thickness of the protective layer of the optical information recording medium.

12. An optical information recording/reproduction apparatus comprising:

the optical information recording medium according to any one of claims 3 to 10;

an optical head;

a rotating unit which causes rotation of said optical information recording medium;

a control unit which controls said optical head; and recording/reproduction means of performing at least one of recording of information on said optical information recording medium and reproduction of information from said optical information recording medium.

13. The optical information recording/reproduction apparatus according to claim 12, wherein said optical head has aberration correction means of correcting aberration which occurs due to a thickness of the protective layer of said optical information recording medium.

* * * * *

UNITED STATES PATENT AND TRADEMARK OFFICE
CERTIFICATE OF CORRECTION

PATENT NO. : 6,862,740 B2
DATED : March 1, 2005
INVENTOR(S) : Akihiro Yasuda et al.

It is certified that error appears in the above-identified patent and that said Letters Patent is hereby corrected as shown below:

Title page,
Item [57], ABSTRACT,
Line 4, after "specified" insert -- and --.

Column 19,
Line 63, after "..." insert -- + --.

Signed and Sealed this

Thirtieth Day of August, 2005

JON W. DUDAS
*Director of the United States Patent and Trademark Office*